United States Patent
Asakawa et al.

(10) Patent No.: US 7,600,185 B2
(45) Date of Patent: Oct. 6, 2009

(54) INFORMATION PROCESSING FOR CREATING A DOCUMENT DIGEST

(75) Inventors: Chieko Asakawa, Kanagawa-ken (JP); Kentaro Fukuda, Sagamihara (JP); Junji Maeda, Tokyo-to (JP); Hironobu Takagi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 10/807,983

(22) Filed: Mar. 24, 2004

(65) Prior Publication Data
US 2004/0230905 A1 Nov. 18, 2004

(30) Foreign Application Priority Data
Mar. 28, 2003 (JP) .............................. 2003-091791

(51) Int. Cl.
*G06F 17/00* (2006.01)
(52) U.S. Cl. ........................................ 715/246; 715/255
(58) Field of Classification Search ......... 715/517–522, 715/513, 501.1, 242–247
See application file for complete search history.

(56) References Cited

U.S. PATENT DOCUMENTS

| | | | |
|---|---|---|---|
| 5,895,476 A * | 4/1999 | Orr et al. ..................... | 715/517 |
| 6,023,714 A * | 2/2000 | Hill et al. ..................... | 715/513 |
| 6,857,102 B1 * | 2/2005 | Bickmore et al. ......... | 715/501.1 |
| 2001/0054049 A1 * | 12/2001 | Maeda et al. ............... | 715/517 |
| 2002/0078097 A1 * | 6/2002 | Chen et al. .................. | 715/517 |
| 2006/0282445 A1 * | 12/2006 | Chen et al. .................. | 707/100 |

FOREIGN PATENT DOCUMENTS

| | | |
|---|---|---|
| JP | PUPA 11-120195 | 4/1999 |
| JP | PUPA 2001-184344 | 7/2001 |
| JP | PUPA 2002-229985 | 8/2002 |
| JP | PUPA 2002-35/736 | 12/2002 |

OTHER PUBLICATIONS

Timothy Bickmore, Web Page Filtering and Re-Authoring for Mobile Users, Apr. 21, 1999, The computer Journal, vol. 42, No. 6, pp. 534-546.*
Wel-contents transacting system.
Digest method of web page using annotation, Aug. 16, 2001.

* cited by examiner

*Primary Examiner*—Doug Hutton
*Assistant Examiner*—Quoc A Tran
(74) *Attorney, Agent, or Firm*—Law Offices of Ira D. Blecker, P.C.

(57) ABSTRACT

Digest screen display content deciding means selects display elements belonging to respective regions of a document based on display priorities of the display elements, which are obtained by digest screen display priority information creating means, and decides selected display elements as display content of a digest screen under a condition where a total display area does not exceed a required display area. A merging relationship among the regions is set based on layout information for the regions, created by digest screen region layout information creating means. Display content deciding means decides the display content of a detail screen based on the merging relationship among the regions, and creates a digest of the detail screen based on control information created by control information creating means. Moreover, digest screen display content changing means changes the display content of the digest screen in response to an operation of a user.

3 Claims, 18 Drawing Sheets

FIG. 6

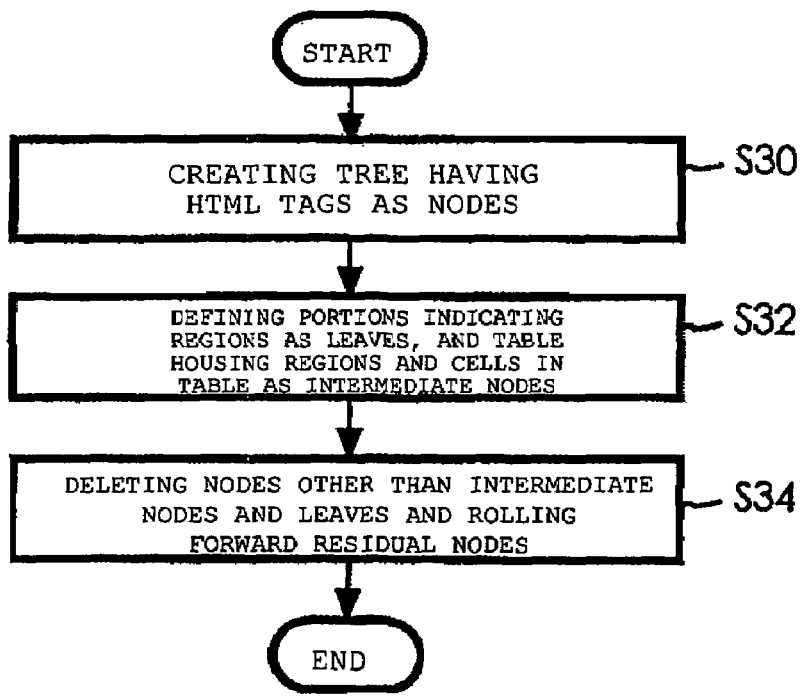

FIG. 7

```
           START
             │
             ▼
┌───────────────────────────┐
│   CREATING TREE HAVING    │──S30
│   HTML TAGS AS NODES      │
└───────────────────────────┘
             │
             ▼
┌───────────────────────────┐
│ DEFINING PORTIONS INDICATING│
│ REGIONS AS LEAVES, AND TABLE│──S32
│ HOUSING REGIONS AND CELLS IN│
│ TABLE AS INTERMEDIATE NODES │
└───────────────────────────┘
             │
             ▼
┌───────────────────────────┐
│ DELETING NODES OTHER THAN INTERMEDIATE │
│ NODES AND LEAVES AND ROLLING           │──S34
│ FORWARD RESIDUAL NODES                 │
└───────────────────────────┘
             │
             ▼
            END
```

FIG.8
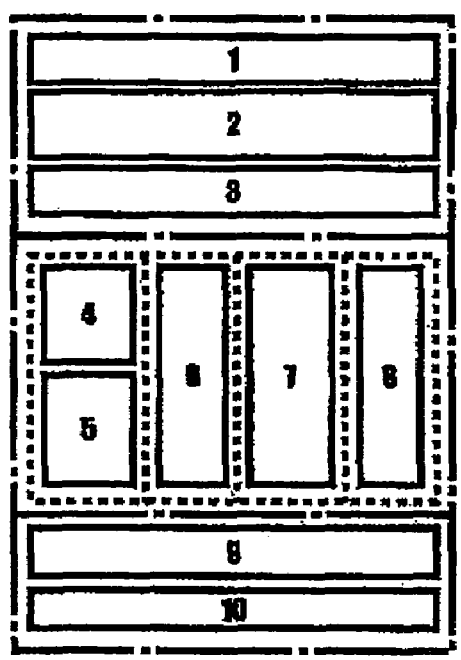
(a)
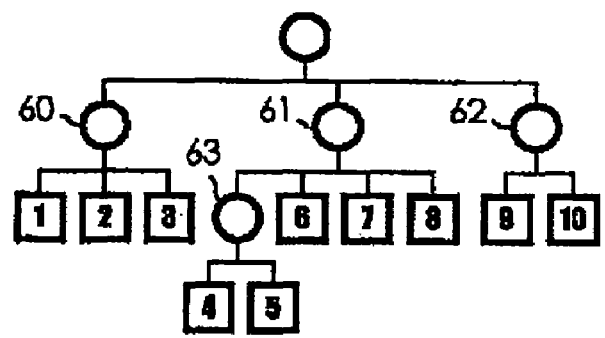
(b)

FIG. 11
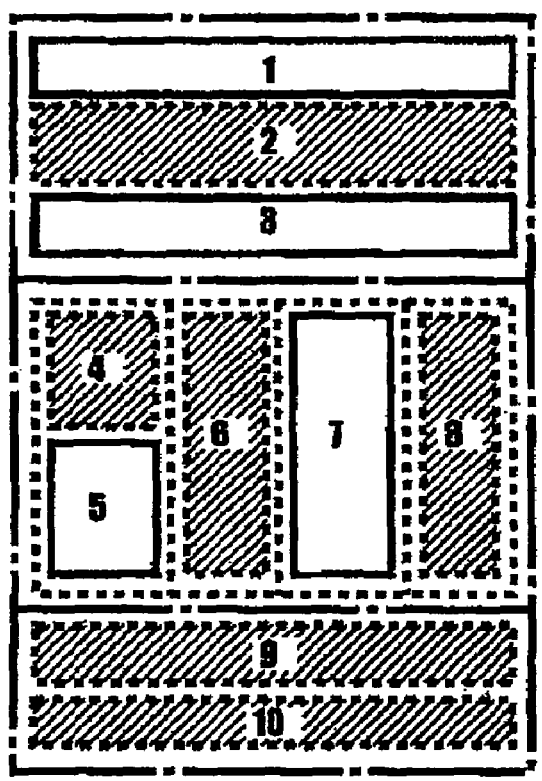
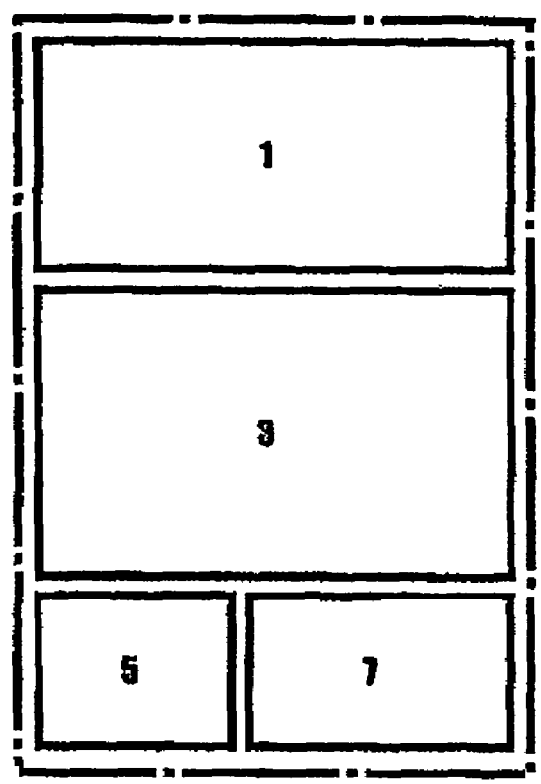
(a)          (b)

FIG.12
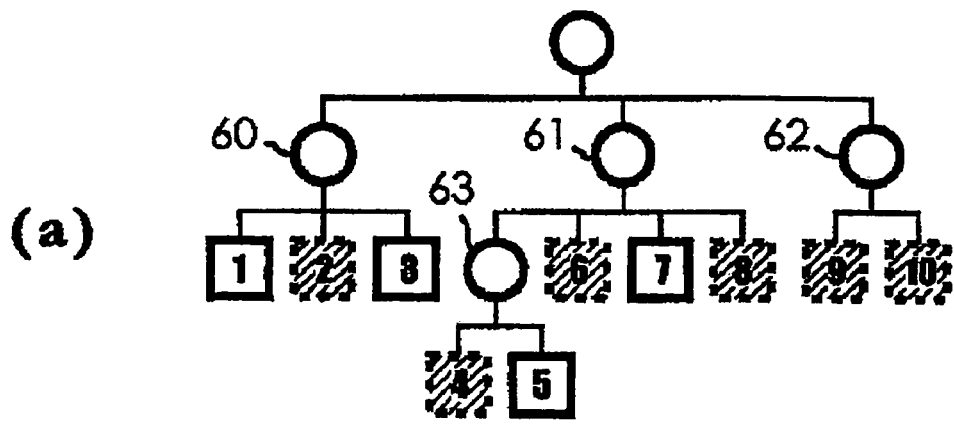
(a)
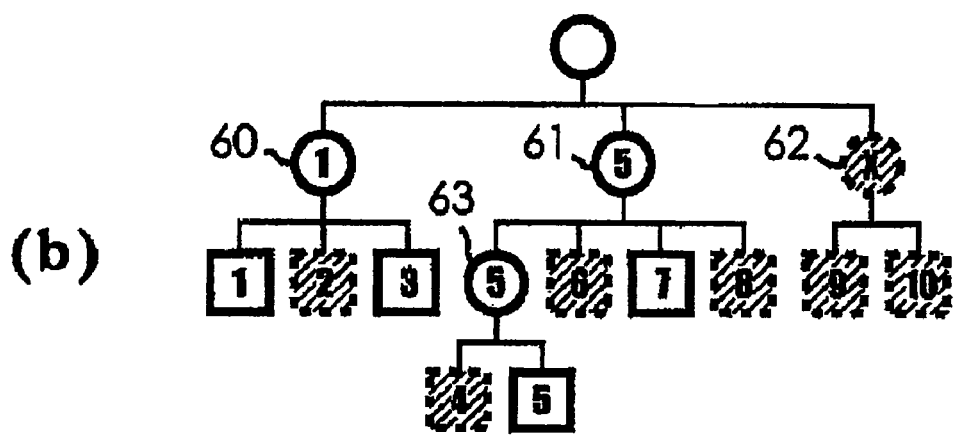
(b)
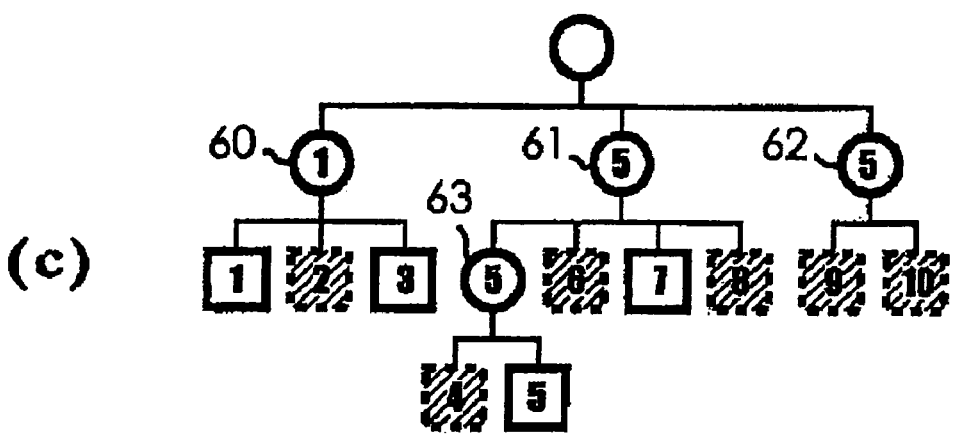
(c)

INFORMATION PROCESSING FOR CREATING A DOCUMENT DIGEST

FIELD OF INVENTION

The present invention is directed to an information processing apparatus, a server, a method and a program for creating a digest of a document, such as a Web page, the layout of which is predetermined by a creator.

BACKGROUND OF THE INVENTION

A variety of documents are displayed on a display device of a computer. A Web page accessed through the Internet is one of such documents. Incidentally, as types and contents of information submitted through the Internet have been enriched more in recent years, an amount of information per Web page has also been increased more. Consequently, there has occurred a situation where the Web page becomes too large to fit in a display screen of the display device. Such a situation is one occurring also in the case where the aged and persons having weak eyesight zoom the document for the purpose of reading characters displayed on the display device.

This situation where the document such as the Web page becomes too large to fit in the display screen causes a plurality of problems described below. First, there occurs a problem that a user is forced to perform a scroll operation. This scroll operation is usually performed by raising or lowering a scroll bar with a mouse, and therefore, becomes a cumbersome operation for a user. Particularly, for an aged person and a user who is not good at adjusting his/her body delicately, the scroll operation is one involving difficulty.

Moreover, since it becomes unable to view the whole page at a glance, such problems as below also occur particularly for the aged person: it becomes difficult to grasp the layout of the whole of the page (load on comprehension); it becomes difficult to find a target section from the whole of the page (load on attention); and it is necessary to remember a content of an upper part of the page when reading a lower part thereof (load on a short-term memory). Today, when our society is aging rapidly, such problems as described above are serious.

As a method for solving the problems described above, a method for creating a digest of the document such as the Web page is conceivable, in which a display area of the document is fitted within an area designated by a reader. In this case, it is desirable if not only the display area is merely fitted to the designated area but also areas occupied by respective portions constituting the document can be allocated in accordance with significance thereof to effectively utilize the display area.

Heretofore, as this type of technology, there has been a method for creating a digest of the web page, in which a layout of the Web page is automatically analyzed based on tags of an HTML (refer to Patent Document 1). In this method, the Web page is divided while tracing a tree structure, in which strength of each tag of the HTML is reflected on a hierarchy, from a root thereof to a leaf direction, and the page the digest of which is to be displayed is sorted. Then, contents to be displayed in the respective regions sorted in accordance with significance of the tags of the HTML are decided so as not to delete important information.

Moreover, as another conventional technology, there is a method for creating a digest of a Web page based on annotations (refer to Non-Patent Document 1). In this method, locations and significance of regions, which are obtained by external annotations, are utilized. Specifically, the locations of the regions on the digest are decided based on the regions designated by the annotations, and a plurality of regions designated to have high significance by the annotations are displayed while trying to maintain original area ratios thereof as much as possible.

Furthermore, as still another conventional technology, there is a method in which a layout of a plurality of articles are automatically decided (refer to Patent Document 2). In this method, articles are being divided into groups of the articles the numbers of which become smaller step by step with reference to significance of the articles, and display areas for the groups of articles to be displayed are being decided sequentially until all the numbers of articles belonging to the respective groups of articles become one.

[Patent Document 1] Gazette of Japanese Patent Laid-Open No. 2001-184344 (pp. 5-6, FIG. 13)

[Patent Document 2] Gazette of Japanese Patent Laid-Open No. Hei 9(1997)-330314

[Non-Patent Document 1] Maeda and three others, "Digesting Technology for Web Page Based on Annotation," Technical Research Report (Welfare Information Technology) of The Institute of Electronics, Information and Communication Engineers, 2001, vol. 101, No. 263, pp. 25-30

However, in the foregoing digest creation method using the tags of the HTML, the Web page is being divided in accordance with the tree structure in which the layout is reflected, and therefore, information cannot be shared among the regions that have already been branched, and the areas cannot be allocated to the regions optimal for the whole page.

In the foregoing digest creation method using the annotations, the areas are allocated to regions in consideration of the significance thereof for the whole page. However, in this conventional technology, all of the regions are displayed in order to ensure accesses to digested regions. Therefore, it cannot be said that the limited display area can be effectively utilized, and when the number of regions is large, it is not ensured that the digest fits in the display area required by the reader.

Also in the foregoing method in which the layout of the plurality of articles is decided, similarly to the above, the display areas of the articles are decided for the whole of the page in accordance with the significance of the articles. However, in this conventional technology, the articles are grouped and arranged in accordance with the significance thereof, and therefore, this technology cannot be applied to a document the layout of which is predetermined. In addition, in this technology, a relatively few number of articles are assumed, and all of the articles are to be displayed. Accordingly, it becomes impossible to ensure that the articles will be fitted in the area required by the reader when the number of articles becomes larger. Note that, when the total area is forcibly limited, only a small area insufficient for practical use will be allocated to an article the significance of which is low.

Hence, it is desirable to realize a system for creating a digest of a document, in which a document, such as a Web page, the layout of which is predetermined by a creator, is transformed to certainly guarantee that the transformed document will fit within a display area required by a reader, and areas are optimally allocated to divided regions so as to make the most of the display area. At this time, it is necessary to ensure accesses to information lost by creating the digest.

From this point of view, for example, in the foregoing digest creation method using the tags of the HTML, when a desired region is designated, the whole content of the region is displayed by detailed content displaying means, and such lost information can be acquired. However, accesses to regions that are not displayed on a digest screen at all cannot be ensured by this method.

Moreover, it is desirable to realize a system enabling such browsing as approaching a target portion, in which digests are created also on detail screens, and a range from which information is to be acquired is narrowed step by step while confirming the whole structure of a page. Furthermore, from a viewpoint of providing a more comfortable browsing environment, it is desirable to realize a system for changing displays of digests and detailed contents in response to an operation of a user.

SUMMARY OF THE INVENTION

Therefore, there is now provided systems apparatus and methods providing a technology for creating a digest, in which a document, the layout of which is predetermined by a creator, is transformed to make certain that the transformed document is fitted within a display area required by a reader.

Another aspect of the present invention provides a technology enabling such browsing of a document as approaching a target portion, in which a range from which information is to be acquired is narrowed step by step while confirming the whole structure of the document.

It is still another aspect of the present invention to provide a more comfortable browsing environment, in which a display content of a digest screen is changed in response to an operation of a user.

In order to achieve these aspects, the present invention provides an information processing apparatus for creating a digest of a document the layout of which is determined, the document including a plurality of regions, each region including one or more display elements, the apparatus comprising: means for selecting the display elements based on display priorities of the display elements, and for deciding all of selected display elements as a display content of a digest screen under a condition where a total display area of all of the selected display elements does not exceed a required display area; and means for setting a merging relationship among the regions by deciding a merging region, with which a region not being displayed on the digest screen is merged, from among regions displayed on the digest screen based on layout information for the regions in the document, all of the regions being included in the document.

According to the present invention, it can be ascertain that the document, such as the Web page, the layout of which is predetermined by the creator is transformed to fit within the display area required by the reader.

Furthermore, according to the present invention, because the display content of the digest screen can be changed in response to the operation of the user, a browsing environment capable of sensitively coping with a user's wish can be provided.

BRIEF DESCRIPTION OF THE DRAWINGS

The invention and its embodiments will be more fully appreciated by reference to the following detailed description of advantageous and illustrative embodiments in accordance with the present invention when taken in conjunction with the accompanying drawings, in which:

FIG. 6(a) is a view showing states of the display elements for each region before being sorted in order of the display priorities;

FIG. 6(b) is a view showing a sequence of the display elements after being sorted;

FIG. 7 is a flowchart showing an example of a method for creating a tree representing a layout of regions;

FIG. 8(a) is a view showing a Web page formed of a plurality of the regions;

FIG. 8(b) is a tree representing a layout of the regions of the Web page;

FIG. 11(a) is a view conceptually showing a state of the Web page shown in FIG. 8(a) after visible/invisible regions on the digest screen are fixed;

FIG. 11(b) is a view showing an actual appearance of the Web page shown in FIG. 11(a) on a Web browser;

FIG. 12(a) is a view showing a state of the tree shown in FIG. 8(b) after the visible/invisible regions on the digest screen are fixed;

FIG. 12(b) is a view showing a state of the tree shown in FIG. 12(a) after region IDs of visible nodes are set;

FIG. 12(c) is a view showing a state of the tree shown in FIG. 12(b) after region IDs of invisible nodes are set;

FIG. 19(a) is a view showing a state before change;

FIG. 20(a) is a view showing a state before change;

DETAILED DESCRIPTION OF THE INVENTION

Figure 1:
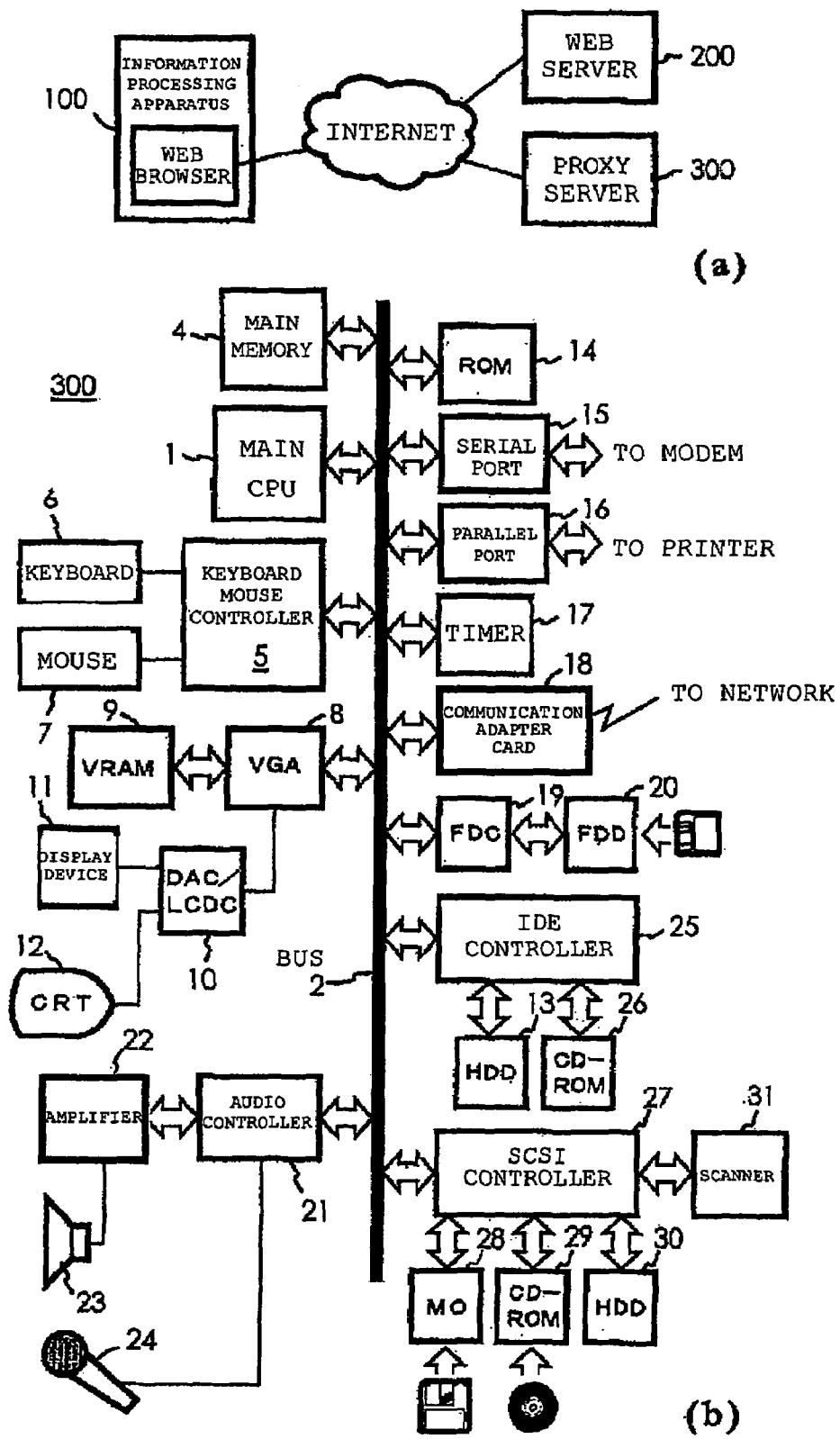
FIG. 1(a) is a conceptual view showing an example of a configuration of a system realizing a method of the present invention.
FIG. 1(b) is a conceptual view showing an example of a configuration of a computer system realizing the method of the present invention.

The present invention provides methods, systems and apparatus for providing a technology for creating a digest, in which a document, the layout of which is predetermined by a creator, is transformed to make certain that the transformed document is fitted within a display area required by a reader. At this time, areas are adapted to be optimally allocated to divided regions so as to make the most of the display area, and accesses to information lost by creating the digest of the document are ensured.

The present invention also provides a technology enabling such browsing of a document as approaching a target portion, in which a range from which information is to be acquired is narrowed step by step while confirming the whole structure of the document.

The present invention further provides a more comfortable browsing environment, in which a display content of a digest screen is changed in response to an operation of a user.

The present invention provides an information processing apparatus for creating a digest of a document the layout of which is determined, the document including a plurality of regions, each region including one or more display elements, the apparatus comprising: means for selecting the display elements based on display priorities of the display elements, and for deciding all of selected display elements as a display content of a digest screen under a condition where a total display area of all of the selected display elements does not exceed a required display area; and means for setting a merging relationship among the regions by deciding a merging region, with which a region not being displayed on the digest screen is merged, from among regions displayed on the digest screen based on layout information for the regions in the document, all of the regions being included in the document.

Moreover, the information processing apparatus according to the present invention can further comprise means for deciding, as a display content of a detail screen, a region group including the regions displayed on the digest screen and a region merged with the displayed regions in response to that a detail display of the displayed regions is required. Furthermore, this information processing apparatus can further comprise means for creating control information for controlling a display of the detail screen, and the means for deciding the display content of the detail screen can create a digest of the detail screen based on the control information when the region group is too large to fit in the required display area.

Moreover, the information processing apparatus according to another aspect of the present invention can further comprise means for changing the display content of the digest screen based on an operation of a user. Here, the changing means can include means for automatically changing the display content of the digest screen, accompanying the operation of the user.

Moreover, the present invention provides a server for creating a digest of a document the layout of which is determined, the server transmitting information for creating the digest of the document the layout of which is determined to a client terminal together with the document, the server comprising: means for obtaining display priorities of a plurality of display elements belonging to each of regions of the document based on attributes of the display elements; and means for creating layout information for the regions in the document. Furthermore, the means for obtaining the display priorities can further include: means for arraying, for each of the regions, display elements belonging to the regions in accordance with a predetermined criterion; means for obtaining a ratio of a cumulative length of each of the arrayed display elements in each of the regions by dividing the cumulative length by a total length of the region; and means for dividing the ratio of the cumulative length by a significance of the region to which the display element belongs, the ratio having been obtained for each of the display elements.

Moreover, the present invention provides a method for creating a digest of a document the layout of which is determined, the document including a plurality of regions, each region including one or more display elements, the method comprising the steps of: selecting the display elements based on display priorities of the display elements, and for deciding all of selected display elements as a display content of a digest screen under a condition where a total display area of all of the display elements does not exceed a required display area; and setting a merging relationship among the regions by deciding a merging region, with which a region not being displayed on the digest screen is merged, from among regions displayed on the digest screen based on layout information for the regions in the document, all of the regions being included in the document.

Moreover, the method according to the present invention for creating a digest of a document the layout of which is determined can further comprise the step of deciding, as a display content of a detail screen, a region group including the regions of the document displayed on the digest screen and the region merged with the displayed regions in response to that a detail display of the displayed regions is required. Furthermore, this method can further comprise the steps of: creating control information for controlling a display of the detail screen; and creating a digest of the detail screen based on the control information when the region group is too large to fit in the required display area.

Moreover, the method according to another aspect of the present invention for creating a digest of a document the layout of which is determined can further comprise the step of changing the display content of the digest screen based on an operation of a user.

Moreover, the present invention provides a program for creating a digest of a document the layout of which is determined, the document including a plurality of regions, each region including one or more display elements, the program allowing a computer to realize: a function to select the display elements based on display priorities of the display elements, and to decide all of selected display elements as a display content of a digest screen under a condition where a total display area of all of the selected display elements does not exceed a required display area; and a function to set a merging relationship among the regions by deciding a merging region, with which a region not being displayed on the digest screen is merged, from among regions displayed on the digest screen based on layout information for the regions in the document, all of the regions being included in the document.

Moreover, the program according to the present invention for creating a digest of a document the layout of which is determined can further allow the computer to realize a function to decide, as a display content of a detail screen, a region group including the regions displayed on the digest screen and the region merged with the displayed regions in response to that a detail display of the displayed regions is required. Furthermore, this program can further allow the computer to realize: a function to create control information for controlling a display of the detail screen; and a function to create a digest of the detail screen based on the control information when the region group is too large to fit in the required display area.

Moreover, the program according to another aspect of the present invention for creating a digest of a document the layout of which is determined can further allow the computer to realize a function to change the display content of the digest screen based on an operation of a user.

According to the present invention, it can be guaranteed that the document, such as the Web page, the layout of which is predetermined by the creator is transformed to fit within the display area required by the reader. Accordingly, for example, if the display area required by the reader is set at an area of a current window, it is guaranteed that a scroll operation for browsing the document is not required. Moreover, the display elements of the display content of the digest screen are selected based on the display priorities of the display elements, and therefore, it is made possible to effectively utilize the limited display area in terms of information acquisition. Furthermore, regions that are not displayed on the digest screen at all are merged with regions partially or entirely displayed on the digest screen, and the merging relationship is set between such display areas and such non-display areas. Therefore, accesses to all information lost by creating the digest of the document can be ensured.

Moreover, according to the present invention, because the digest is also created for the detail screen, it is made possible to constantly confirm the whole structure of the page, and such browsing as approaching a target portion by narrowing step by step a range from which information is to be acquired is enabled.

Furthermore, according to the present invention, because the display content of the digest screen can be changed in response to the operation of the user, a browsing environment capable of sensitively coping with a user's wish can be provided. Particularly, when the display content is automatically changed accompanying the operation of the user, for example, when a region for which the user requires a display of a detail content is automatically reduced, a situation is eliminated, where a spot that has been browsed once is undesirably displayed many times, and thus a very comfortable browsing environment for the user is provided.

The present invention will be described below in detail based on embodiments shown in the accompanying drawings. However, it is possible to embody the present invention in many different modes, and the present invention should not be interpreted as being limited to description contents of the present embodiments. Note that the same reference numerals will be added to the same elements throughout the whole of these embodiments.

Although the embodiments below mainly describe a system or a method, the present invention can also be embodied as a program usable by a computer besides the system and the method, as obvious to those skilled in the art. Hence, the present invention can choose an embodiment as hardware, an embodiment as software, or an embodiment as a combination of software and hardware.

FIG. 1(a) is a conceptual view showing an example of a configuration of a system, to which a method for creating a digest of a document the layout of which is determined according to the present invention is applied. In this embodiment of the present invention, the information processing apparatus 100 transmits an access request to the proxy server 300 through the Internet in order to acquire desired data from the Web server 200. Preferably, the access request is realized as an HTTP request known to those skilled in the art. The proxy server 300 relays the access request to the Web server 200 through the Internet, and relays response data from the Web server 200 to the information processing apparatus 100 through the Internet. In such a way, the information processing apparatus 100 receives the desired response data. The information processing apparatus 100 is a known terminal connectable to the Internet, and is realizable as appropriate by those skilled in the art. It is advantageous to connect the information processing apparatus 100 to the Internet by dial-up and the like through an ISP (Internet Service Provider, not shown). Such a connection of the information processing apparatus 100 to the ISP is not limited to the dial-up, but the connection may be constantly made by use of a dedicated line, ADSL (Asymmetric Digital Subscriber Line), CATV (Cable Television) and the like.

In this embodiment of the present invention, the proxy server 300 can be realized by a computer system having a hardware configuration as shown in FIG. 1(b). The computer system includes the central processing unit (CPU) 1 and the main memory 4. The CPU 1 and the main memory 4 are connected to the hard disk devices 13 and 30 as auxiliary storage devices through the bus 2. Moreover, removable storages (external storage systems having exchangeable recording media) such as the flexible disk device 20, the MO device 28 and the CD-ROM devices 26 and 29 are connected to the bus 2 through the flexible disk controller 19, the IDE controller 25, the SCSI controller 27 and the like, which are associated therewith.

The recording media such as a flexible disk, an MO and a CD-ROM are inserted into the removable storages such as the flexible disk device 20, the MO device 28 and the CD-ROM devices 26 and 29, respectively. A code of a computer program for embodying the present invention by giving commands to the CPU and the like in cooperation with an operating system can be recorded in the flexible disk and the like, the hard disk devices 13 and 30 and the ROM 14. The computer program is executed by being loaded on the main memory 4. The computer program can be recorded after being compressed. Alternatively, the computer program can be divided into a plurality of pieces, which can be then recorded in a plurality of media.

The computer system can further include, as user interface hardware, the pointing device 7 such as a mouse, the keyboard 6, and the display 12 for submitting visual data to a user. Moreover, it is possible to connect the computer system to a printer (not shown) through the parallel port 16 and to a modem (not shown) through the serial port 15. It is possible for the computer system to make a connection to a network through a set of the serial port 15 and the modem, the communication adapter 18 (Ethernet(R) card, token ring card) or the like, and to communicate with other computers and the like.

The speaker 23 receives, through the amplifier 22, an audio signal subjected to D/A conversion (digital/analog conversion) by the audio controller 21, and outputs the received signal as a sound. Moreover, the audio controller 21 subjects audio information received from the microphone 24 to A/D conversion (analog/digital conversion), thus making it possible to capture audio information from the outside of the system and put it into the system.

From the above description, it will be easily understood that the proxy server 300 in this embodiment of the present invention is realized by an information processing apparatus such as a main frame, a workstation, a usual personal computer (PC), a laptop PC, a notebook PC, a palmtop PC, a network computer and a PDA (Personal Data Assistant) or a combination thereof. However, these constituent elements are for illustrative purpose, and all of these constituent elements do not necessarily become essential constituent elements of the present invention.

The information processing apparatus 100 and the Web server 200 are also realizable by computer systems having similar hardware configurations. For the Web server, the proxy server and the information processing terminal, which are for use in embodying the present invention, various alterations such as embodying the respective hardware constituent elements thereof by combining a plurality of machines and allocating functions thereto are ones that can easily be assumed by those skilled in the art. Naturally, these alterations are concepts incorporated in the principle of the present invention.

It is preferable that each of the proxy server 300 and the information processing apparatus 100 and the Web server 200 be installed with software such as an operating system and middleware for making full use of a hardware resource thereof. Preferably, each of the proxy server 300 and the Web server 200 is realized by eServer pSeries(R) as a server computer installed with AIX(R) as an operating system provided by International Business Machines Corporation. Moreover, preferably, the information processing apparatus 100 is realized by a personal computer (PC) installed with Windows(R) 2000 as an operating system provided by Microsoft Corporation. In addition, the information processing apparatus 100 is installed with a Web browser as other software. As such a Web browser, a general Web browser such as Netscape Navigator of Netscape Communications Corporations and Internet Explorer of Microsoft Corporation is applicable.

Figure 2:
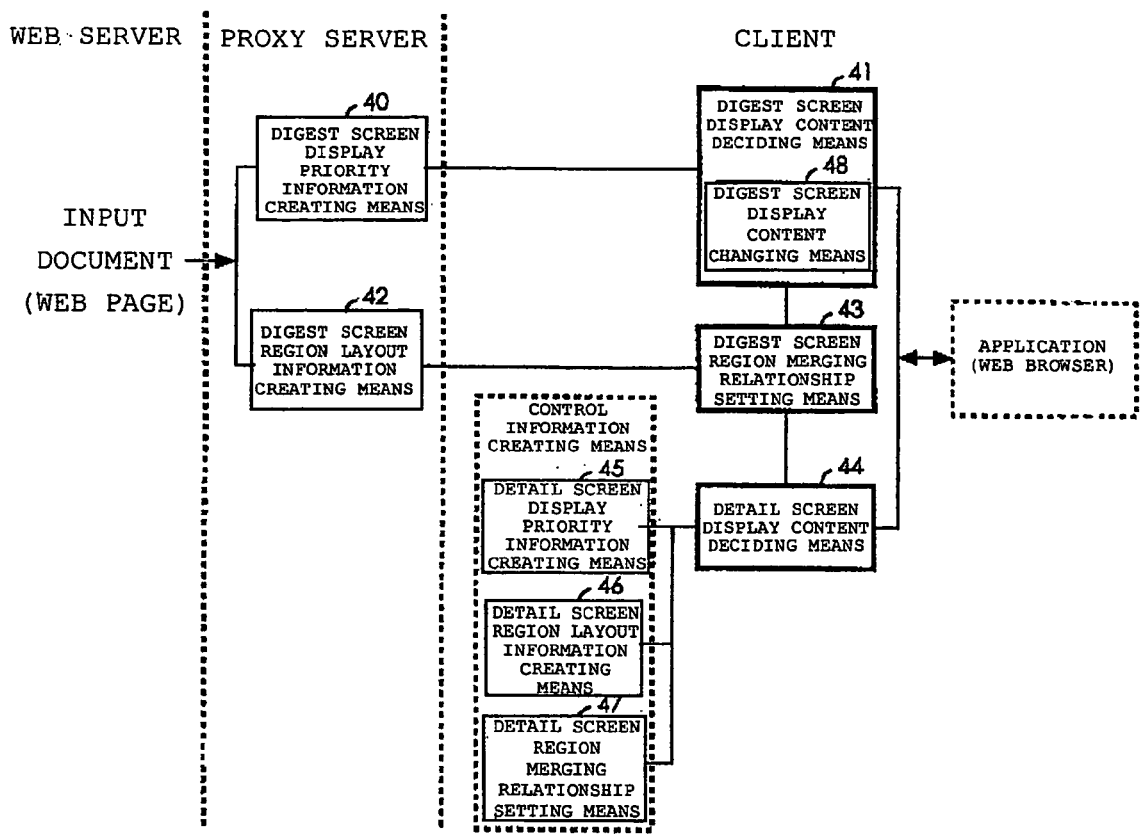
FIG. 2 is a block diagram showing the example of the configuration of the system realizing the method of the present invention.

FIG. 2 is a block diagram showing an example of an information processing system according to the present invention for creating a digest of a document the layout of which is determined. This embodiment is configured such that a Web page is to be processed, and that an information processing apparatus as a client issues a request to the Web server through the proxy server to acquire the Web page. The system of this embodiment comprises: the proxy server including the digest screen display priority information creating means 40 and the digest screen region layout information creating means 42; and the information processing apparatus including the digest screen display content deciding means 41, the digest screen region merging relationship setting means 43, the detail screen display content deciding means 44, and the control information creating means having the detail screen display priority information creating means 45, the detail screen region layout information creating means 46 and the detail screen region merging relationship setting means 47. Moreover, the digest screen display content deciding means 41 includes the digest screen display content changing means 48. Note that it is also possible to mount functions provided by the digest screen display priority information creating means 40 and the digest screen region layout information creating means 42, both of which are provided in the proxy server, onto the Web server or the information processing apparatus.

The function of the digest screen display priority information creating means 40 is realized by executing a program code recorded in the foregoing storage device such as the hard disk, in which hardware resources such as the storage devices 13 and 30, the central processing unit 1 and the main memory 4 are mainly utilized. The digest screen display priority information creating means 40 has functions to obtain display priorities of display elements based on the attributes of the display elements belonging to each region of the Web pages formed of the plurality of regions, and to prepare information concerning the display priorities.

Here, the Web page (HTML document) to be inputted is divided into regions of semantic clusters, and is imparted with significance for each of the regions. Note that such division of the regions and impartment of the significance can be realized using a publicly known technology including a method for automatically analyzing the regions based on information in the document, such as HTML tags, a method for manually preparing external annotations, and the like. The display elements of the document belong to any one of the regions, and are units to be controlled whether or not to be displayed. As specific examples of the units to be controlled whether or not to be displayed, portions delimited by the HTML tags, or sentences or words are given.

In this embodiment, as attributes of the display elements for use when obtaining the display priorities of the display elements, areas of the display elements, emerging positions of the display elements in the regions to which the elements belong and the significance of the regions to which the elements belong are used. However, it is needless to say that the attributes are not limited to these. In such a way, in the event of obtaining the display priorities of the display elements, information intrinsic to the client is not required in principle. A calculation method for the display priorities will be described later.

The function of the digest screen display content deciding means 41 is realized by executing a program code recorded in the foregoing storage device such as the hard disk, in which the hardware resources such as the storage devices 13 and 30, the central processing unit 1 and the main memory 4 are mainly utilized. The digest screen display content deciding means 41 has functions to select the display elements based on the display priorities of the display elements, and to decide all of the selected display elements as a display content of the digest screen under the condition where the total display area of all of the selected display elements does not exceed a required display area. Hence, there is a possibility that a region formed only of display elements having low priorities is not displayed on the digest screen at all.

The required display area is a display area required directly by a user or indirectly by the information processing apparatus. In this embodiment, the required display area is set to a current window size of the Web browser. Note that, in the description below, this display area is referred to as an "acceptable area" in the meaning that an area for displaying the document must be set within the concerned display area.

The function of the digest screen region layout information creating means 42 is realized by executing a program code recorded in the foregoing storage device such as the hard disk, in which the hardware resources such as the storage devices 13 and 30, the central processing unit 1 and the main memory 4 are mainly utilized. The digest screen region layout information creating means 42 has a function to create layout information for the regions, which is utilized when setting a merging relationship between a display area and a non-display area on the digest screen. As described above, there is a possibility that a region having low priorities is not displayed on the digest screen at all. Therefore, it is necessary to merge such a non-display region with a display region other than the same in accordance with a predetermined rule for the purpose of ensuring accesses to the non-display region by the user. In this case, which region is displayed or not on the digest screen depends on circumstances of the client, such as a font size desired by the user and a window size of an application for displaying the document. However, the information intrinsic to the client is not required for creating the layout information for the regions. Hence, as described above, the digest screen region layout information creating means 42 can be provided as an independent function of the proxy server. Note that a creation method for the layout information for the regions will be described later.

The function of the digest screen region merging relationship setting means 43 is realized by executing a program code recorded in the foregoing storage device such as the hard disk, in which the hardware resources such as the storage devices 13 and 30, the central processing unit 1 and the main memory 4 are mainly utilized. The digest screen region merging relationship setting means 43 has a function to decide, after the display content of the digest screen is determined, a merging region, with which the region that is not displayed on the digest screen at all is merged, from among the regions displayed on the digest screen. In this event, the layout information for the regions, which has been created by the digest screen region layout information creating means 42, is utilized. Note that the regions displayed on the digest screen include not only ones all the display elements of which are displayed on the digest screen but also ones part of the display elements of which are displayed on the digest screen. Hereinafter, such regions are referred to as "visible regions," and the regions that are not displayed on the digest screen at all are referred to as "invisible regions." Moreover, in the merging relationship, invisible regions merged with the other regions are referred to as "merged regions," and visible regions that merge the merged regions are referred to as "merging regions." A setting method for the merging relationship will be described later.

The function of the detail screen display content deciding means 44 is realized by executing a program code recorded in the foregoing storage device such as the hard disk, in which the hardware resources such as the storage devices 13 and 30, the central processing unit 1 and the main memory 4 are mainly utilized. The detail screen display content deciding means 44 has a function to decide, as a display content of the detail screen, a region group formed of regions displayed on the digest screen and merged regions merged with the displayed regions in response to that a detail display of the displayed regions is required. In this event, the detail screen display content deciding means 44 refers to a merging relationship among the regions set by the digest screen region merging relationship setting means 43. Moreover, when the foregoing group of regions cannot be fitted within the acceptable area, the detail screen display content deciding means 44 selects the display elements based on the display priorities obtained by the detail screen display priority information creating means 45 to be described later, thus creating the digest of the detail screen. In this event, the merging relationship among the regions on the detail screen is set by the detail screen region layout information creating means 46 and the detail screen region merging relationship setting means 47, which are to be described later.

The function of the detail screen display priority information creating means 45 is realized by executing a program code recorded in the foregoing storage device such as the hard disk, in which the hardware resources such as the storage devices 13 and 30, the central processing unit 1 and the main memory 4 are mainly utilized. The detail screen display priority information creating means 45 has a similar function to that of the digest screen display priority information creating means 40 except that target display elements are different.

The function of the detail screen region layout information creating means 46 is realized by executing a program code recorded in the foregoing storage device such as the hard disk, in which the hardware resources such as the storage devices 13 and 30, the central processing unit 1 and the main memory 4 are mainly utilized. The detail screen region layout information creating means 46 has a similar function to that of the digest screen region layout information creating means 42 except that target regions are different.

The function of the detail screen region merging relationship setting means 47 is realized by executing a program code recorded in the foregoing storage device such as the hard disk, in which the hardware resources such as the storage devices 13 and 30, the central processing unit 1 and the main memory 4 are mainly utilized. The detail screen region merging relationship setting means 47 has a similar function to that of the digest screen region merging relationship setting means 43 except that target regions are different.

The digest screen display content changing means 48 is included in the digest screen display content deciding means 41, and has a function to change the display content of the digest screen based on operations of the user. Here, as the operation of the user, there are operations performed directly for the digest screen and performed indirectly for the detail screen. As an example of the latter one, an operation when closing the detail screen and returning to the digest screen can be given. In this case, the digest screen display content changing means 48 changes an initial one of the digest screen to another one at the timing when the user returns to the digest screen. In addition, the digest screen display content changing means 48 can also change the display content of the digest screen automatically, accompanying the operation of the user.

As changes of the digest screen, in this embodiment, there are considered five kinds, which are: enlargement of a specific region; reduction of a specific region; deletion of a specific region; display of a specific invisible region; and selection of a specific region. Specific changing methods will be described later.

Next, concrete operations of the information processing system of the present invention will be described in accordance with a general order when a user browses a Web page.

1. Method for Creating Digest Screen

Figure 3:
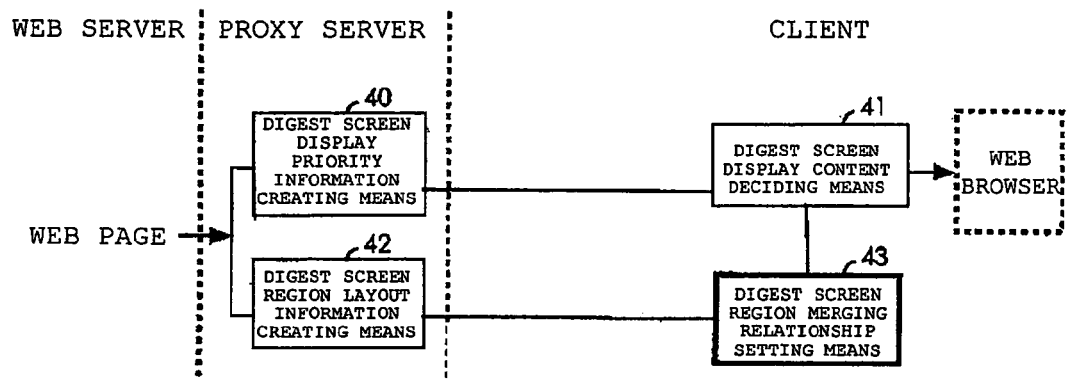
FIG. 3 is a block diagram of portions relating to digest screen display, which are extracted from FIG. 2.

Here, a flow of processing from acquiring the Web page from the Web server through the proxy server to creating the digest of the Web page will be described. FIG. 3 is a view showing portions relating to the digest screen creation, which are extracted from FIG. 2. As shown in FIG. 3, the digest screen display priority information creating means 40, the digest screen display content deciding means 41, the digest screen region layout information creating means 42 and the digest screen region merging relationship setting means 43 relate to the creation of the digest screen.

Figure 4:
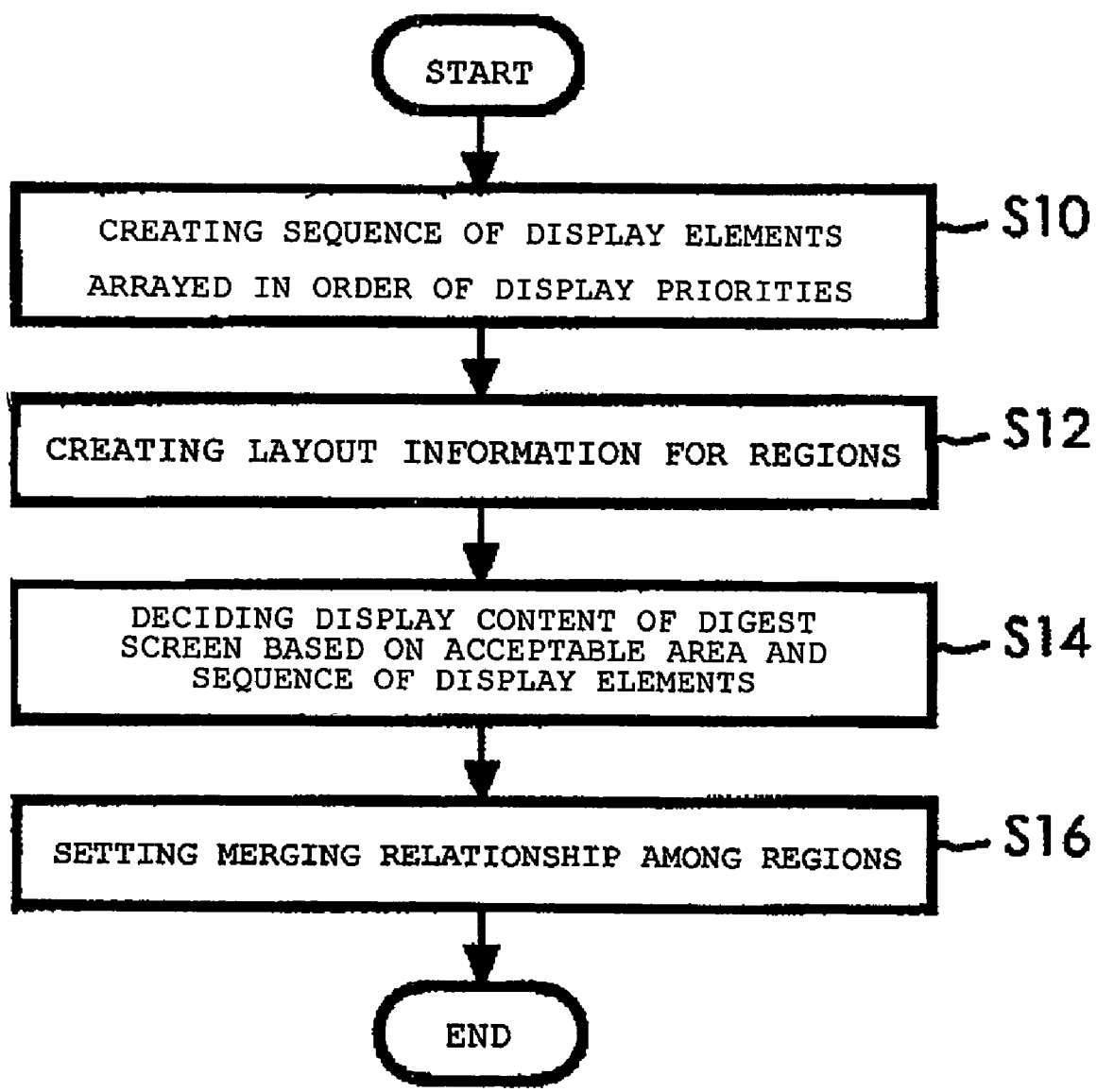
FIG. 4 is an overall flowchart showing an example of a method for creating a digest screen.

FIG. 4 is an overall flowchart showing an example of the method for creating a digest screen. In Step S10 of FIG. 4, the digest screen display priority information creating means 40 obtains the display priorities of all of the display elements of the Web page, and creates a sequence of the display elements arrayed in order of the display priorities thereof. Next, in Step S12, the digest screen region layout information creating means 42 creates layout information for the regions of the Web page. Next, in Step S14, the digest screen display content deciding means 41 decides the display content of the digest screen based on the acceptable area and the sequence of the display elements received from the digest screen display priority information creating means 40. Finally, in Step S16, the digest screen region merging relationship setting means 43 sets the merging relationship between the display area and the non-display area on the digest screen based on the layout information for the regions, which is received from the digest screen region layout information creating means 42. Here, there are no limitations on an execution order of the processing's performed in Steps S10 and S12, and therefore, the processing in Step S12 can be performed before the processing in Step S10.

Note that two processings described below as preprocessings shall be provided for the Web page (HTML document) before the processings in Steps S10 and S12. One is processing for scanning a tree structure (DOM tree) made from the Web page and embedding therein <SPAN> tags as direct parents of texts, images and the like displayed on the Web browser. Thus, it is made possible to uniformly treat processings for contents such as the texts and the images as processing for the <SPAN> tags. The "display element" referred to in this embodiment shall mean one formed by combining each of the texts, images and the like with the <SPAN> tag as the direct parent thereof. Note that, in the general Web browser, there is no change on the appearance of the Web page even if such processing is provided. Another processing is processing for dividing a text into pieces with a suitable length by using, as hints, punctuation marks including commas and periods, segments of words and the like. Each of the divided texts has the <SPAN> tag as its parent, and becomes a display element. Note that in the case of performing such processings, regional information intrinsic to the Web page, that is, the locations and significance of the respective regions are referred to. Typically, this information is stored as a file of an XML format, and the locations and significance of the respective regions are expressed as attributes of XML tags. XPaths can be utilized for designating the locations of the regions on the original Web page. Moreover, the significance are indicated by real numbers of 0 or more.

Figure 5:
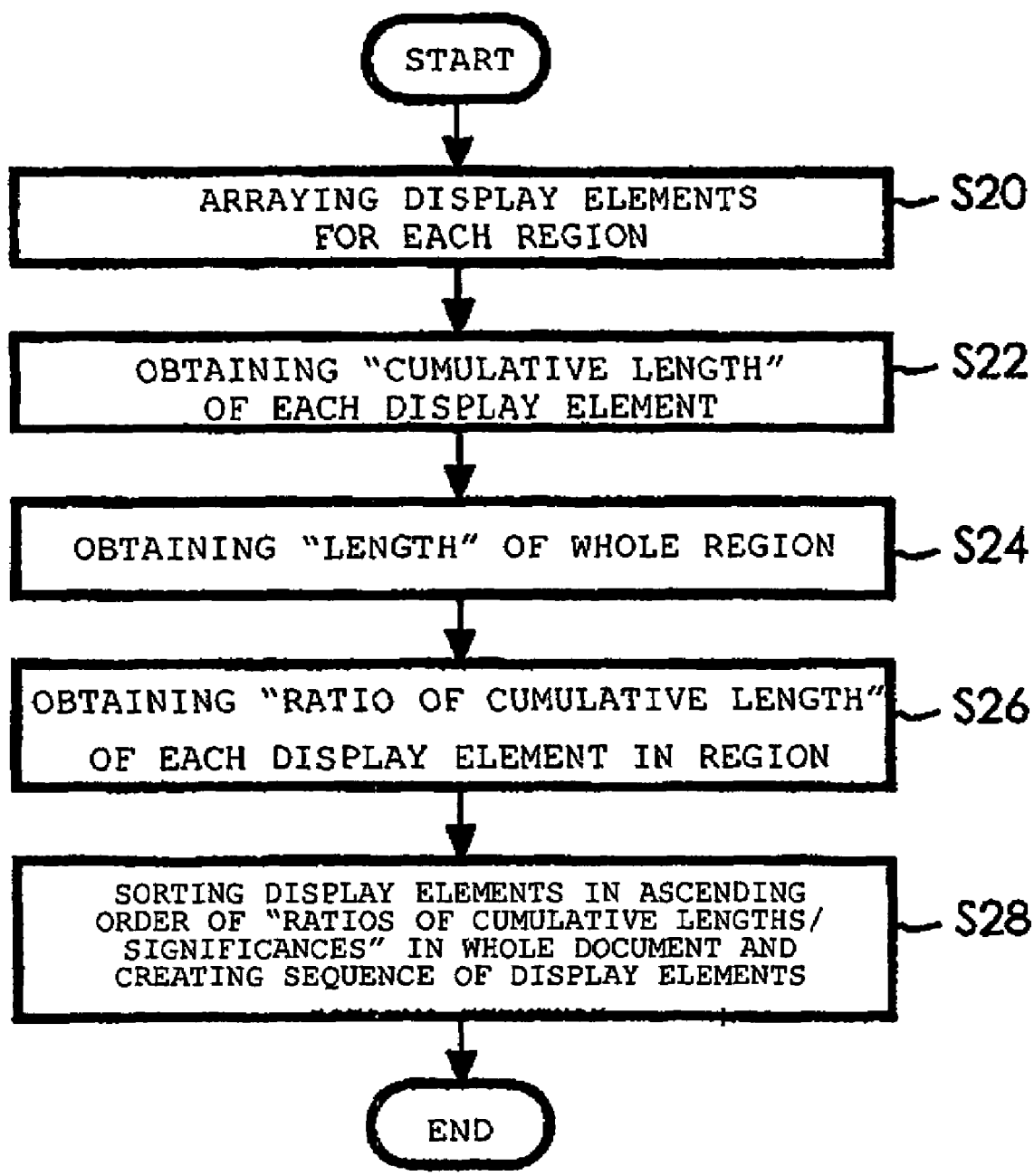
FIG. 5 is a flowchart showing an example of a method for creating a sequence of display elements arrayed in order of display priorities.

Next, an operation of creating the sequence of the display elements arrayed in order of the display priorities thereof, which is performed by the digest screen display priority information creating means 40, will be concretely described with reference to the flowchart of FIG. 5 and the explanatory state view of FIG. 6. In Step S20 of FIG. 5, the digest screen display priority information creating means 40 arrays, for each of the regions of the Web page, the display elements belonging thereto in accordance with a predetermined criterion. In principle, the display priorities are put in this array order. Hence, as the predetermined criterion, for example, the sequence where the display elements emerge on the Web page is conceivable. According to the criterion, when only a part of a region is displayed on the digest screen, display elements belonging to the region will be sequentially selected in order from a head thereof without skipping any one of the following elements, and the selected display elements will be displayed on the digest screen. Moreover, as other criteria, HTML tags and attributes of the tags, which are ancestors of the respective display elements in the DOM tree, are conceivable. Furthermore, when the display elements are texts, the display elements can be weighted based on whether the texts contain a particular keyword. In the case of using these criteria, when a part of the regions is displayed on the digest screen, a "large text," a "colored text," a "text containing an important keyword" and the like will be displayed on the digest screen preferentially.

Next, in order to grasp the display area on the Web browser, a "cumulative length" of each of the display elements is obtained (Step S22). An example of the "length" is the number of characters of the text. Also for the image, if possible, a "length" compatible with that of the text is obtained by use of a "width attribute" and a "height attribute" When these attributes cannot be used, it is assumed that the image has a predetermined "length." Specifically, for example, a constant is established such that "the image is regarded to have a width of 200 pixels and a height of 200 pixels," and the established constant is converted into the "length" of the text. The display elements are arrayed for each of the regions as determined in Step S20, and "cumulative lengths" of the respective regions to each thereof are obtained. For example, if four display elements in a certain region has "lengths" of 10, 5, 20 and 15 in order, the "cumulative lengths" become 10, 15, 35 and 50, respectively. Moreover, the "length" of the whole region is also obtained (Step S24). This is obtained by defining the "cumulative length" of the last element in the region as the "length" of the whole region. Next, "ratios of the cumulative lengths" of the respective display elements in the region are obtained (Step S26). The "ratios of the cumulative lengths" are obtained by dividing the "cumulative lengths" of the display elements by the "length" of the whole region for each thereof. Hence, the "ratio of the cumulative length" of the last display element in the region always becomes 1, and the display elements other than the last one take values larger than 0 and smaller than 1.

Finally, the display priorities of the display elements are obtained, the display elements are sorted on the whole of the Web page in order of the display priorities, and the sequence of the display elements arrayed in order of the display priorities are created (Step S28). Here, the display priorities are obtained by dividing the "ratios of the cumulative lengths" of the respective display elements obtained in Step S26 by the "significance" of the region to which the display elements belong for each thereof (however, this processing is not performed for the region the "significance" of which is 0, and the region shall forcibly be set as an "invisible region"). Hence, the smaller the values of the display priorities are, the higher the priorities the display priorities indicate. The above processing will be described with reference to the explanatory state view of FIG. 6. FIG. 6(a) shows states of the display elements for each of the regions before sorted. In FIG. 6(a), the rectangles indicate regions, and the squares and the circles indicate display elements belonging to the regions. In the illustrated example, the Web page is formed of three regions, which are the regions 50, 51 and 52, and these regions have significance of 0.9, 0.5 and 0.1, respectively. Region numbers added in emerging order on the Web page are given to the respective regions. Here, the region numbers 1, 2 and 3 are given to the regions 50, 51 and 52, respectively. Moreover, the predetermined criterion for arraying the display elements is an emerging order thereof in each of the regions here. With regard to the numbers written in each of the display elements, the numbers on the upper row indicate the foregoing region number and an emerging order in the region ("x-y" denotes a y-th display element in a region of a region number x), the number on the middle row indicates a "ratio of the cumulative length," and the number on the lower row indicates a "display priority." In this processing, a blank or a bullet of an itemized text is not treated as a single display element but treated as one unified with the next display element. In FIG. 6(a), the first, third and fifth display elements in the region of the region number 2 correspond to such unified elements, and are represented by circles. Then, when sorting these display elements in ascending order of the display priorities, the display elements turn into the state shown in FIG. 6(b). Note that the display priorities of the display elements such as bullets are not considered.

Next, an operation of creating the layout information for the regions, which is performed by the digest screen region layout information creating means 42, will be concretely described with reference to the flowchart of FIG. 7 and the explanatory correspondence relationship view of FIG. 8. First, a Web page to be processed is shown in FIG. 8(a). In the illustrated example, two tables are made by <TABLE> tags, and one table is nested in the other. The outside table is drawn by the alternate long and short dashed lines, and has three cells in the longitudinal direction. The inside of the center cell further has a table. This inside table is drawn by the dotted lines, and has four cells in the lateral direction. Each cell includes one or more regions, and each region is represented by a rectangle. The numbers written in the rectangles indicate region numbers. As described above, in the HTML document, layouting in which the document is aligned longitudinally and laterally is realized by the structure of the table, which is made by the <TABLE> tags. The tree showing the layout of the regions on the Web pages is shown in FIG. 8(*b*). In FIG. 8(*b*), leaves represented by the squares correspond to the regions, and numbers written in the squares indicate the region numbers of the regions corresponding thereto. Moreover, nodes represented by the circles correspond to cells or tables. This tree shown in FIG. 8(*b*) is the layout information for the regions. A method for creating the tree shown in FIG. 8(*b*) will be concretely described below.

In Step S30 of FIG. 7, upon receiving the Web page shown in FIG. 8(*a*), the digest screen region layout information creating means 42 creates a tree structure having HTML tags as nodes. Next, in this tree structure, portions that indicate the regions are defined as leaves, and the table that houses the regions (which is indicted by the <TABLE> tags) and cells in the table (which are indicated by <TD> tags and <TH> tags) are defined as intermediate nodes (Step S32). In this case, a group of regions located outside the outermost table is also adapted to form an intermediate node that merges adjacent regions into one. Thereafter, residual nodes are deleted to roll forward the intermediate nodes and the leaves, and then, the tree shown in FIG. 8(*b*) is finally created (Step S34). Note that, when the digest screen region layout information creating means 42 is provided as a function of a proxy server, the tree showing the layout among the regions can be easily transmitted to a client by being represented as a text such as, for example, ((1, 2, 3), ((4, 5), 6, 7, 8), (9, 10)).

Figure 9:
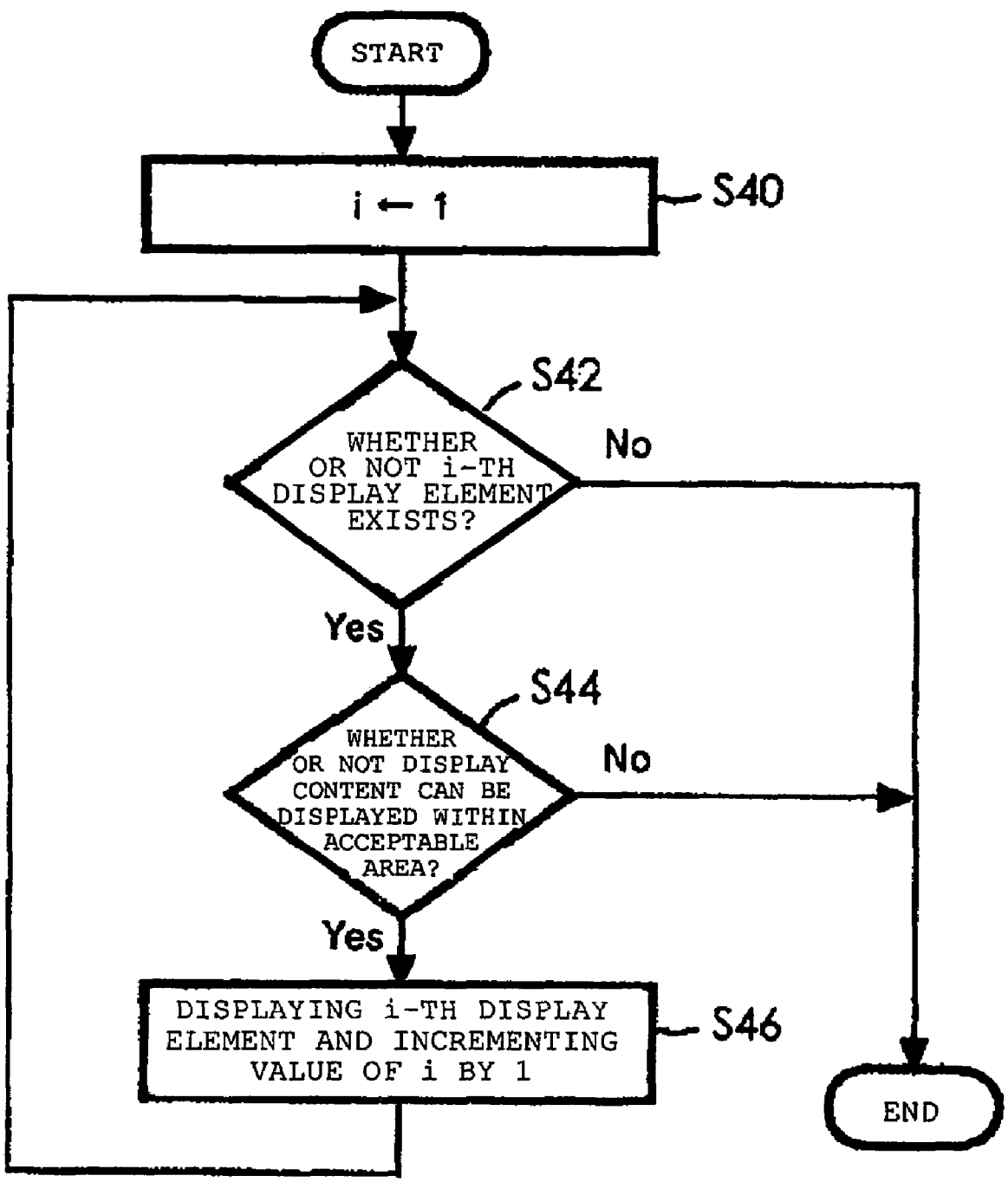
FIG. 9 is a flowchart showing an example of a method for deciding a display content of the digest screen.

Next, an operation of deciding the display content of the digest screen, which is performed by the digest screen display content deciding means 41, will be described with reference to the flowchart of FIG. 9. In Step S40 of FIG. 9, first, 1 is assigned to the variable i. Here, i indicates an order of the display elements in the sequence of the display elements arrayed in order of the display priorities. Specifically, the variable i that is equal to 1 (i=1) indicates the first display element in the sequence of the display elements. Next, in Step S42, it is determined whether or not an i-th display element exists. This determination is one for determining whether or not examination has been made throughout all of the display elements in the sequence thereof. Hence, when the i-th display element does not exist, the processing is terminated. When the i-th display element exists, the processing proceeds to Step S44, where it is determined whether or not the display content is fitted within the acceptable area even if the i-th display element is displayed. When the content is not fitted, the processing is terminated. When the content is fitted, the processing proceeds to Step S46, where the i-th display element is displayed, and the value of the variable i is incremented by 1. Thereafter, the processing returns to Step S42, from which a series of the processing is repeated. The display is controlled within a range where the whole of the display content does not exceed the acceptable area in such a manner as described above, thus making it possible to create a desired digest.

Note that, though a certain display element cannot be displayed because the area thereof exceeds the acceptable area depending on the layout of the Web page to be processed, in some cases, a display element the display priority of which is lower than that of the certain display element (located in a latter sequence of the display elements) can be displayed. In order to display such a display element, a configuration may be adopted, in which all of the display elements in the sequence thereof are examined from the head, and all of the elements capable of being displayed are displayed. With such a configuration, the number of display elements on the digest screen will be increased, and more information can be displayed. On the other hand, there is also a possibility that such a configuration will lead to such a display in which the contents of the original Web page are partially omitted, resulting in a difficulty in semantically understanding the page.

Next, an operation of setting the merging relationship between the visible regions and the invisible regions on the digest screen, which is performed by the digest screen region merging relationship setting means 43, will be concretely described with reference to the flowchart of FIG. 10 and the explanatory state views of FIGS. 11 and 12.

First, the state of a Web page after firmly setting the visible regions and the invisible regions on the digest screen is shown in FIG. 11(*a*). Note that the Web page shown in FIG. 11(*a*) is the same one as the Web page shown in FIG. 8(*a*), and the numbers written in the rectangles indicate the region numbers. In the illustrated example, four regions the region numbers of which are 1, 3, 5 and 7 are decided as the visible regions, and the invisible regions are diagonally shaded. Note that FIG. 11(*a*) is a conceptual view for explanation, and on an actual browser, for example, such a digest as shown in FIG. 11(*b*) is displayed.

FIG. 12(*a*) shows a tree representing the layout of the regions corresponding to those of FIG. 11(*a*). Similarly, leaves corresponding to the invisible regions are diagonally shaded. Moreover, the numbers written in the squares indicate the region numbers of the regions corresponding thereto. From the tree shown in FIG. 12(*a*) as a start point, the merging relationship between the visible regions and the invisible regions is set. Note that, hereinafter, such an intermediate node including one or more visible regions as descendants is referred to as a "visible node," and such an intermediate node the descendant regions of which are all invisible regions is referred to as an "invisible region." In addition, nodes having the same parent node are referred to as "sibling nodes," and in the sibling nodes, one located upward or leftward on the corresponding Web browser is referred to as an "older sibling node," and one located downward and rightward thereon is referred to as a "younger sibling node." In the three trees shown in FIG. 12, the nodes drawn on the left are shown as older sibling nodes. A method for setting the merging relationship will be concretely described below.

Figure 10:
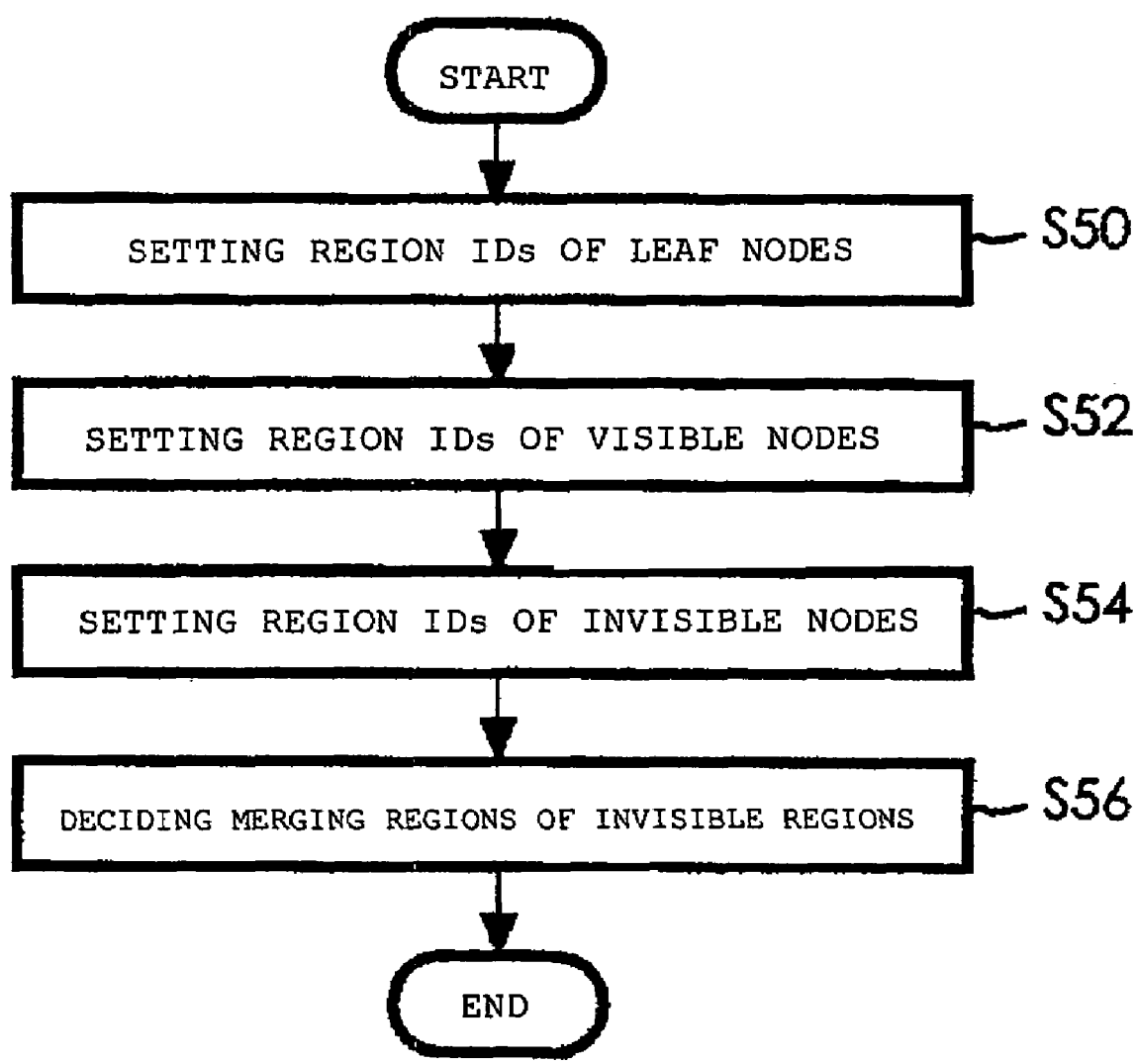
FIG. 10 is a flowchart showing an example of a method for setting a merging relationship among the regions.

In Step S50 of FIG. 10, upon receiving the tree created by the digest screen region layout information creating means 42, the digest screen region merging relationship setting means 43 sets region IDs for the nodes as leaves. Here, for the region IDs set for the leaf nodes, the region numbers of the regions corresponding thereto shall be set.

Next, in Step S52, the region IDs are set for all of the visible nodes while tracing the tree in a bottom-up manner. Here, the region ID set for a visible node shall be set the same as a region ID of a child of the visible node, which is located in the most upper-left position on the corresponding Web page, the child being selected from nodes partially or entirely displayed. Note that, when a plurality of regions applicable to the foregoing condition are present, a region having a higher significance shall be employed. A state where the foregoing processing has been performed for the tree shown in FIG. 12(*a*) is shown in FIG. 12(*b*). Referring to FIG. 12(*b*), for the visible nodes 60 and 61, the region IDS of the child regions located leftward are selected and set in accordance with the foregoing condition. For the visible node 63, there is only one child node partially or entirely displayed, and therefore, the region ID of the concerned node is directly set therefor.

Next, in Step S54, the region IDs are set for all of the invisible nodes while tracing the tree in a top-down manner. Here, with regard to the region ID set for an invisible node, if there are visible nodes in the older sibling nodes of the invisible node, the region ID shall be set the same as that of the closest node thereamong, and if there are no visible nodes in the older sibling nodes, the region ID shall be set the same as that of the closest node among younger sibling nodes. Moreover, also for intermediate nodes of descendants of the concerned invisible node, the same region IDS are set. Note that attention shall be paid to that, in the first invisible nodes in the respective branches in the case of tracing the tree in a top-down manner, at least one of the visible node or the sibling node as a visible region is present. A state where the foregoing processing has been performed for the tree shown in FIG. 12(b) is shown in FIG. 12(c). Referring to FIG. 12(c), the same region ID as that of the visible node 61 is set for the invisible node 62.

Finally, in Step S56, based on the tree in which the region IDs are set for all of the intermediate nodes, merging regions that merge the invisible regions therewith are decided for all of the invisible regions in the tree, and the processing is terminated. Here, each of the merging regions that merge the invisible regions therewith shall be a region identified by the region ID of the closest one of the visible nodes or the visible regions of the older sibling nodes if there are such nodes and regions. Moreover, if there are no visible nodes or visible regions in the older sibling nodes, and if there are visible nodes or visible regions in the younger sibling nodes, the merging region shall be a region identified by the region ID of the closest one thereamong. Furthermore, if there are no visible nodes or visible regions in the older or younger sibling nodes, the merging region shall be a region identified by the region ID of the parent node. A result of performing the foregoing processing based on the tree shown in FIG. 12(c) is shown below.

TABLE 1

| Invisible regions (merged regions) | Visible regions (merging regions) |
|---|---|
| 2 | 1 |
| 4 | 5 |
| 6 | 5 |
| 8 | 7 |
| 9 | 5 |
| 10 | 5 |

Here, the numbers indicate the region numbers (region IDs). The region numbers written on the left side are the region numbers of the invisible regions, that is, of the merged regions. Then, the region numbers written on the right side are the region numbers of the visible regions that merge the foregoing invisible regions therewith. Here, all of the regions indicated by the region numbers 4, 6, 9 and 10 are merged with the visible region of the region number 5. As understood from this, there are no limitations on the number of regions to be merged by the visible regions. The merging relationship between the visible regions and the invisible regions on the digest screen is set in such a manner as described above, thus making it possible to ensure accesses to the regions lost by creating the digest.

2. Method for Displaying Detail Screen of Digest

Figure 13:
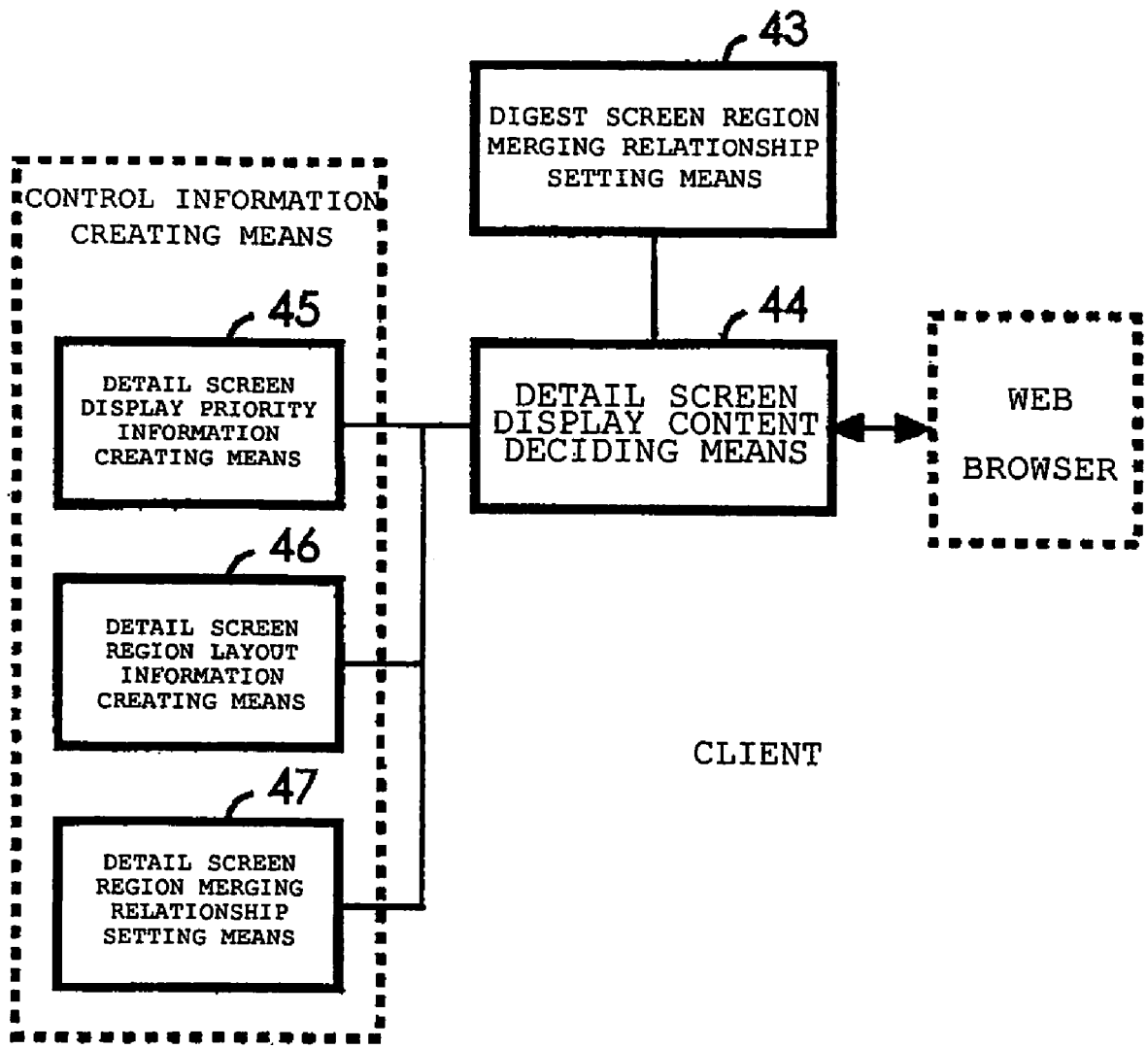
FIG. 13 is a block diagram of portions relating to detail screen display, which are extracted from FIG. 2.

Here, a flow of processing to displaying a detail screen in response to a request for a detail display by a user, which is made in order to access information that is not displayed on the digest screen, will be described. FIG. 13 is a view showing portions relating to the detail screen display of the digest, which are extracted from FIG. 2. As shown in FIG. 13, the digest screen region merging relationship setting means 43, the detail screen display content deciding means 44, the detail screen display priority information creating means 45, the detail screen region layout information creating means 46 and the detail screen region merging relationship setting means 47 relate to the detail screen display of the digest.

Figure 14:
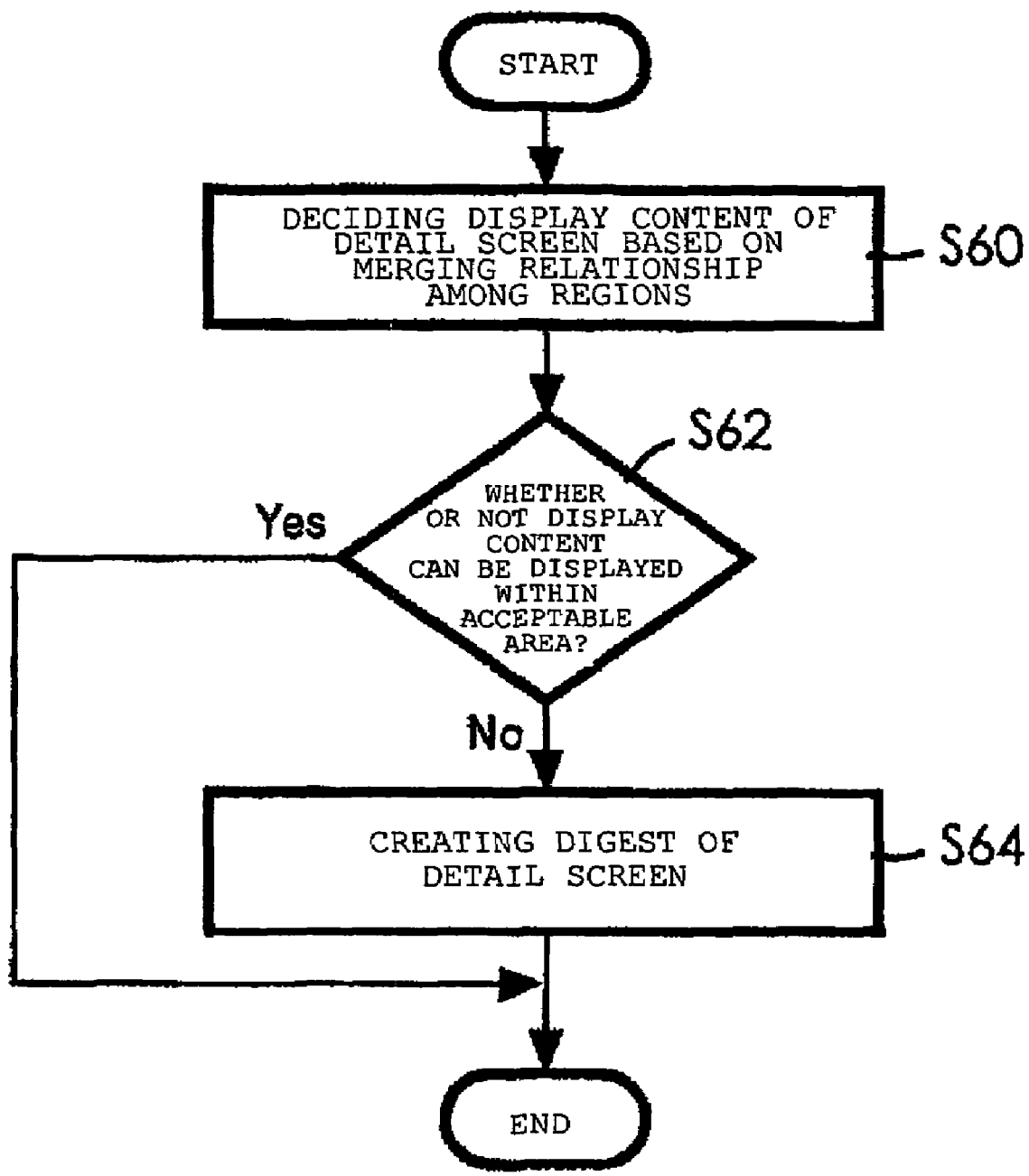
FIG. 14 is an overall flowchart showing an example of a method for displaying a detail screen.

FIG. 14 is an overall flowchart showing an example of the method for displaying the detail screen of the digest. In Step S60 of FIG. 14, the detail screen display content deciding means 44 decides a display content of the detail screen based on the merging relationship among set regions in response to a request for a detail display of the regions to be displayed on the digest screen. Next, in Step S62, it is determined whether or not the decided display content of the detail screen is fitted in the acceptable area. When the display content is fitted in the acceptable area, the processing is terminated there. When the display content is not fitted in the acceptable area, the processing proceeds to Step S64, where the digest of the detail screen is created, and the processing is terminated.

Regions to be decided as the display content of the detail screen in Step S60 of FIG. 14 include not only visible regions explicitly designated by a user but also invisible regions to be merged with the visible regions as the merging regions. Thus, it is made possible for the user to access information that has not been displayed on the digest screen. Relationships between the designated areas and the regions to be actually displayed on the detail screen in the case of following the merging relationship shown in Table 1 will be shown below.

| Designated region | Display region |
|---|---|
| 1 | 1, 2 |
| 3 | 3 |
| 5 | 4, 5, 6, 9, 10 |
| 7 | 7, 8 |

Here, the numbers indicate the region numbers (region IDs). The region numbers written on the left side are the region numbers of the designated regions. Moreover, the region numbers written on the right side so as to correspond to the region numbers of the designated regions are the region numbers of the regions to be actually displayed on the detail screen. According to this, for example, when the user designates the region of the region number 1 and requires the detail screen, the regions of the region numbers 1 and 2 will be displayed. Hereinafter, a group of the regions to be decided as the display content of the detail screen will be referred to as "detail display target regions" or simply "target regions."

When the whole of the detail display target regions are fitted in the acceptable area, the detail display target regions may be directly displayed, thus causing no problem. However, there is a possibility that the whole of the detail display target regions are too large to be fitted in the acceptable area, depending on the merging relationship among the regions on the digest screen. In this case, in the information processing apparatus according to the present invention, a digest is also created for the detail screen, thus making it possible for the user to sequentially narrow a range from which information is obtained and to approach a target portion while confirming the whole structure of the document. A method for creating the digest of the detail screen will be concretely described below.

Figure 15:
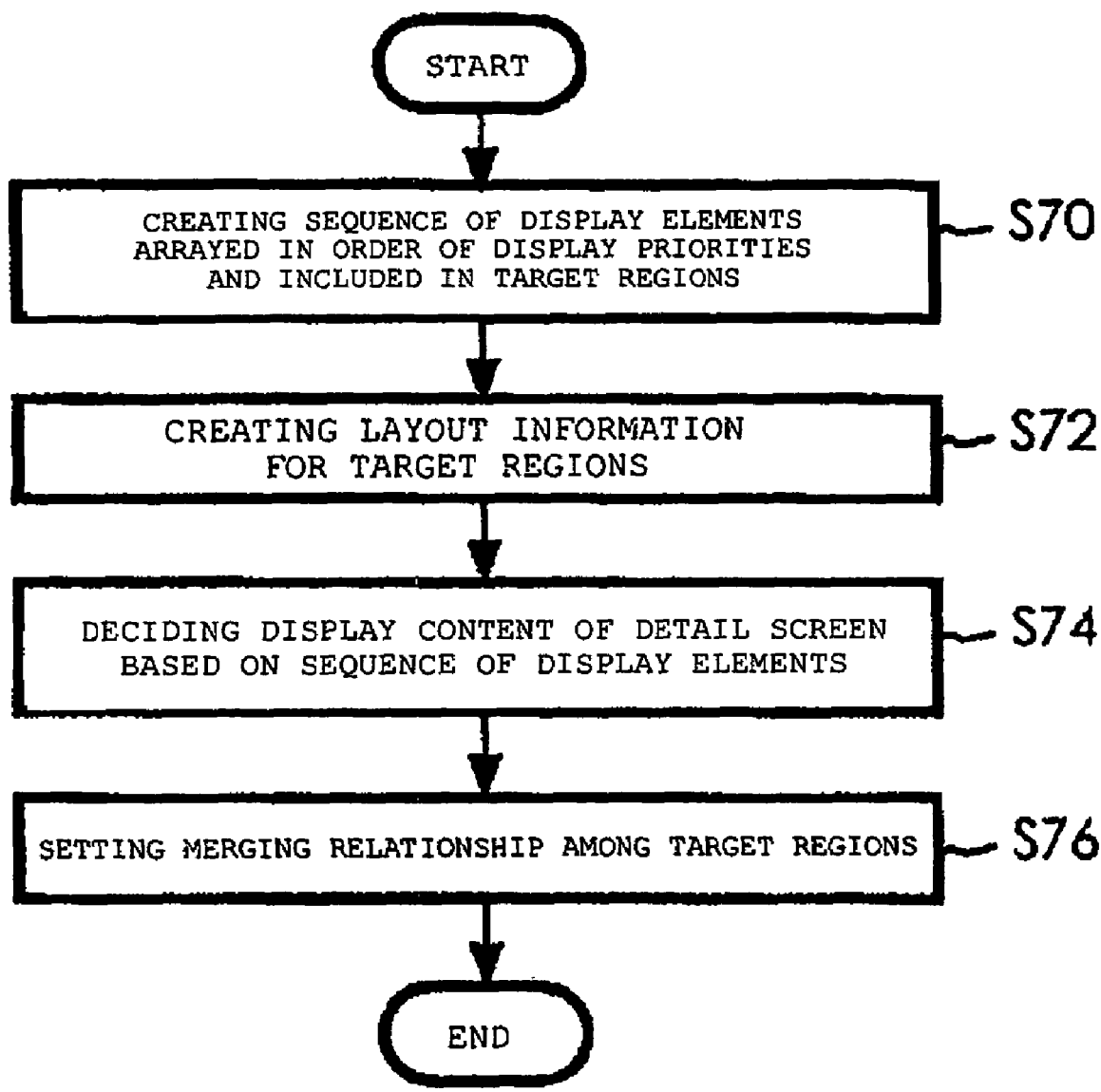
FIG. 15 is a flowchart showing an example of a method for creating a digest of the detail screen.

FIG. 15 is a flowchart showing an example of the method for creating the digest of the detail screen. In Step S70 of FIG. 15, the detail screen display priority information creating means 45 obtains display priorities for display elements included in the target regions, and creates a sequence of the display elements arrayed in order of the display priorities. Moreover, in Step S72, the detail screen region layout information creating means 46 creates layout information for the target regions. Note that, also here, the processing in Step S72 may be performed prior to the processing in Step S70. Next, in Step S74, the detail screen display content deciding means 44 decides the display content of the detail screen based on the sequence of the display elements, which is created by the detail screen display priority information creating means 45. After the display content of the detail screen is fixed, in Step S76, the detail screen region merging relationship setting means 47 sets the merging relationship among the target regions on the detail screen by use of the layout information for the target regions, which is created by the detail screen region layout information creating means 46. Then, the processing is terminated.

Here, the processing performed in each step of FIG. 15 is basically the same as the processing described in "1. Method for displaying digest screen." However, while all of the regions of the Web page and all of the display elements are targets to be processed in the creation of the digest of the Web page, the detail display target regions and the display elements included therein are set to be targets to be processed in the creation of the digest of the detail screen. Moreover, in the case of obtaining display priorities of the display elements included in the detail display target regions, it is desirable to preferentially gather the first display elements of the respective regions of the detail display target regions to a head of the sequence of the display elements from a viewpoint of ensuring the accesses to the regions that have been invisible on the digest screen as much as possible.

As obvious from the foregoing description, the processing for creating the digest of the detail screen can be repeatedly performed until the detail display target regions finally become one. Note that, when the whole of the detail display target regions are too large to be fitted in the acceptable area, it is also possible to display detailed contents in normal display order and to delimit the detailed contents so as to be fitted in the acceptable area for display, as in use of the "more" command in the UNIX(R) operating system. Hence, in the digest creation method for the detail screen, when the detail display target regions are still too large to be fitted within the acceptable area though the regions finally become one, the detailed contents can be displayed in normal display order and can be delimited so as to be fitted in the acceptable area for display.

3. Method for Changing Display Content of Digest Screen

Figure 16:
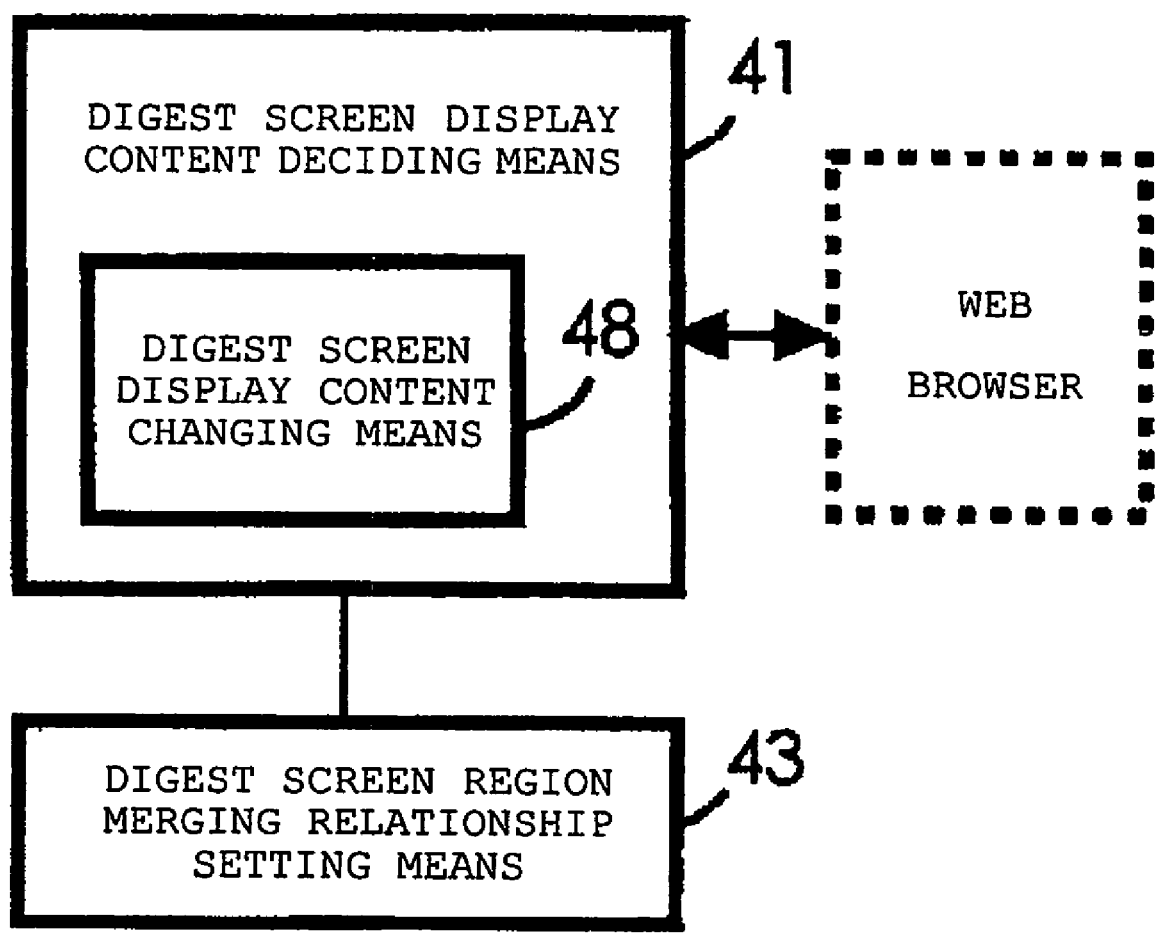
FIG. 16 is a block diagram of portions relating to a change of display on the digest screen, which are extracted from FIG. 2.

A processing flow to changing the display content of the digest screen in response to the operation of the user in order to provide a more comfortable browsing environment will be described. FIG. 16 is a view showing portions relating to the change of the display content of the digest screen, which are extracted from FIG. 2. As shown in FIG. 16, the digest screen display content changing means 48 included in the digest screen display content deciding means 41, and the digest screen region merging relationship setting means 43 relate to the change of the display content of the digest screen.

Figure 17:
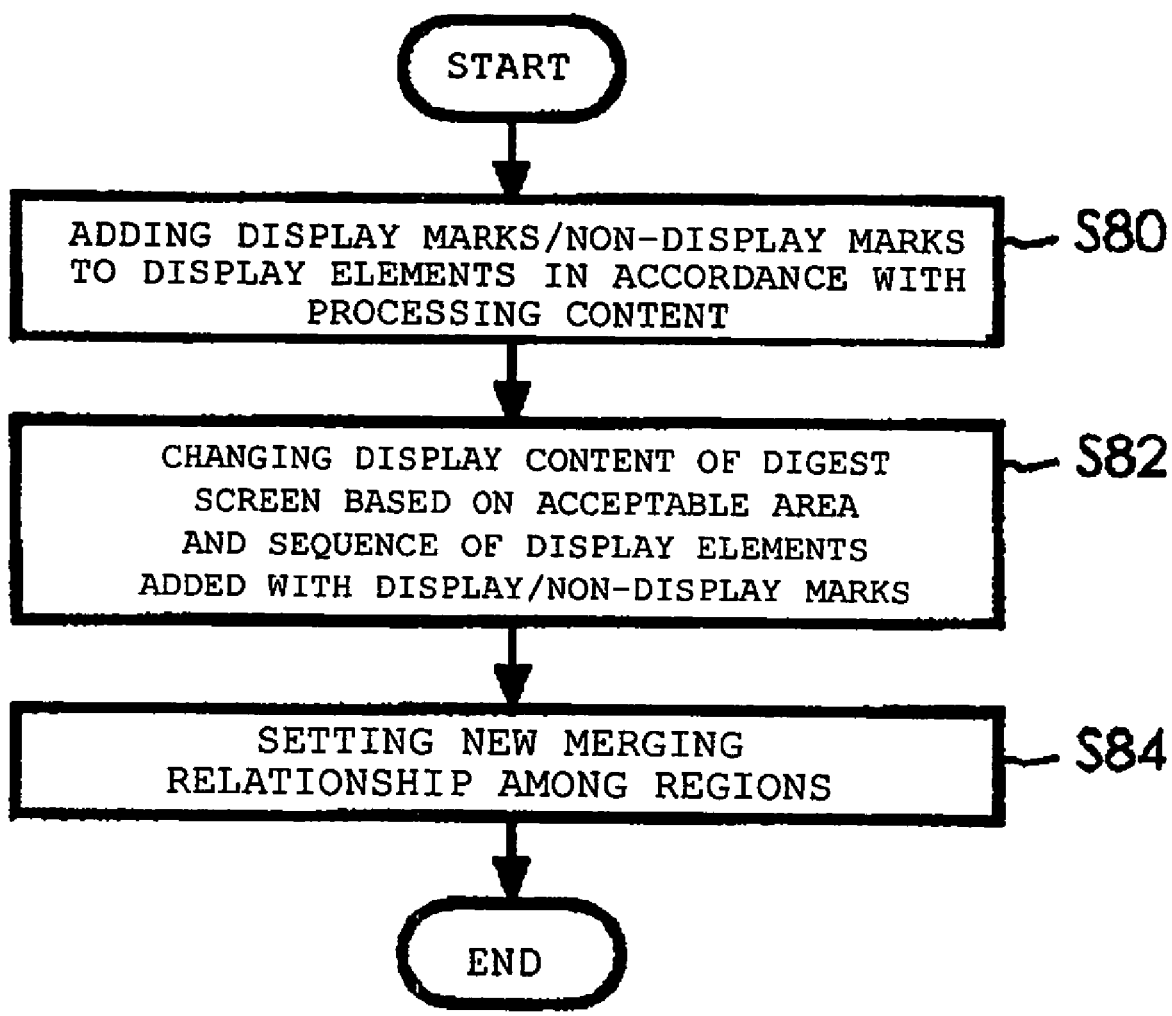
FIG. 17 is an overall flowchart showing an example of a method for changing a display content of the digest screen.

FIG. 17 is an overall flowchart showing an example of the method for changing the display content of the digest screen. In S80 of FIG. 17, the digest screen display content changing means 48 adds "display marks" or "non-display marks" to the display elements as elements in the sequence of the display elements arrayed in order of the display priorities in accordance with the operation of the user. Here, the "display marks" shall be added to display elements desired to be preferentially displayed, and the "non-display marks" shall be added to display elements that are not desired to be displayed. Which mark will be added to which element depends on the operation content of the user. Next, in Step S82, the display content of the digest screen is changed based on the acceptable area and the sequence of the display elements added with the "display marks"/"non-display marks." Next, in Step S84, in response to that new visible and invisible regions have been firmly set on the digest screen, the digest screen region merging relationship setting means 43 sets a new merging relationship between the visible regions and the invisible regions on the digest screen. Then, the processing is terminated.

Here, it is assumed that the operation of the user is converted into control information in accordance with a predetermined operation rule. As described above, in this embodiment, the converted information is any of enlargement of a specific region, reduction of a specific region, deletion of a specific region, display of a specific invisible region, and selection of a specific region. Moreover, the predetermined operation rule is information indicating a correspondence relationship between a physical operation (click, key press and the like) of the user and the change content of the digest screen. For example, the information is that "when a specific portion of a detail screen in a certain region is clicked, the concerned detail screen is deleted, and a region corresponding thereto on the digest screen is reduced," and the like. In this embodiment, the predetermined operation rule shall be sent from the proxy server with the Web page.

Figure 18:
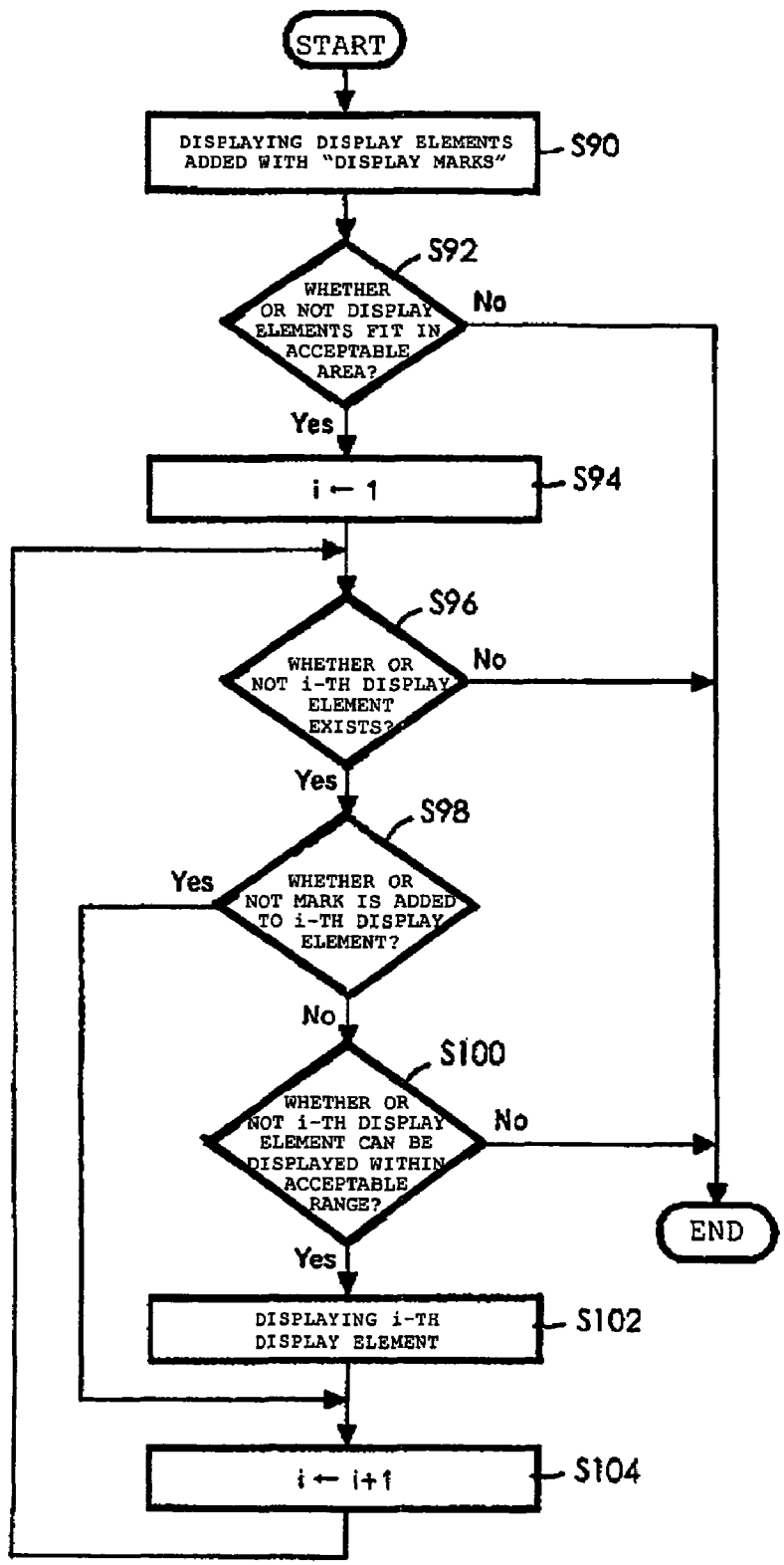
FIG. 18 is a flowchart showing an example of a method for changing the display content of the digest screen based on a sequence of display elements added with display/non-display marks.

FIG. 18 is a flowchart showing the processing of Step S82 in FIG. 17 in more detail. In Step S90 of FIG. 18, the digest screen display content changing means 48 displays all of the display elements added with the "display marks" in the sequence of the display elements. Note that, when a large number of display elements added with the display marks exist, there is also a possibility that all of the display elements cannot be displayed within the acceptable area. Whether or not the display elements are allowed to exceed the acceptable area in such a case, and which display element will be selected when the display elements are not allowed to exceed the acceptable area, shall be predetermined as a rule. For example, display elements having higher display priorities will be selected when the display elements are not allowed to exceed the acceptable area.

Next, in Step S92, it is determined whether or not there is room for further displaying other display elements in the acceptable area. When there is no room, the processing is terminated. When there is room, the processing proceeds to Step S94, where 1 is assigned to the variable i. Here, i indicates an order of the display elements in the sequence of the display elements arrayed in order of the display priorities. Specifically, the variable i that is equal to 1 (i=1) indicates the first display element in the sequence of the display elements. Next, in Step S96, it is determined whether or not an i-th display element exists. This determination is one for determining whether or not examination has been made throughout all of the display elements in the sequence thereof. Hence, when the i-th display element does not exist, the processing is terminated. When the i-th display element exists, the processing proceeds to Step S98, where it is examined whether or not the display mark/non-display mark is added to the i-th display element. When any of the marks is added to the i-th display element, the processing proceeds to Step S104. This is because the display element added with the mark does not require any more processing in any case for the reasons that a display element has already been displayed in Step S90 when the display element is added with the display mark and that a display element is not displayed when the display element is added with the non-display mark. When the i-th display element is not added with any of the marks, the processing proceeds to Step S100. In Step S100, it is determined whether or not the display elements are fitted within the acceptable area even if the i-th display element is displayed in addition to the current display content. When the display content added with the i-th display element is not fitted, the processing is terminated. When the display content is fitted, the processing proceeds to Step S102, where the i-th display element is displayed. When it is determined that the i-th display element is added with any of the marks in S98, or after the processing proceeds from Step S102 to Step S104, where the value of the variable i is incremented by 1, the processing returns to Step S96, from which a series of the processing is repeated.

Note that, even if the i-th display element is determined not to be fitted to the acceptable area in Step S100, there is a case described below depending on the layout of the Web page to be processed. Specifically, there is a case where, though the i-th display element cannot be displayed because the area thereof exceeds the determined area, a display element the display priority of which is lower than that of the i-th display element (located in the latter sequence of the display elements) can be displayed. Hence, such a display element may be adapted to be displayed. For this purpose, it is only necessary that the processing proceeds to Step S104 without termination when the foregoing determination is "not fitted". The method for changing the display content of the digest screen will be concretely described below by taking, as examples, the enlargement of a specific region, the reduction of a specific region, the deletion of a specific region, the display of a specific invisible region, and the selection of a specific region.

3.1. Enlargement of Specific Region

In order to enlarge a specific region, there are used a method for enlarging a font size, a method for opening up a line spacing and the like, a method for increasing the number of display elements to be displayed, and a combined use thereof. In order to expand the area for the regions without increasing the number of display elements to be displayed, it is only necessary that the foregoing processing for deciding the display content of the digest screen be performed after a new font size and the like are set. Here, a method for enlarging the specific region by increasing the number of display elements will be described below with reference to FIG. 19.

Figure 19:
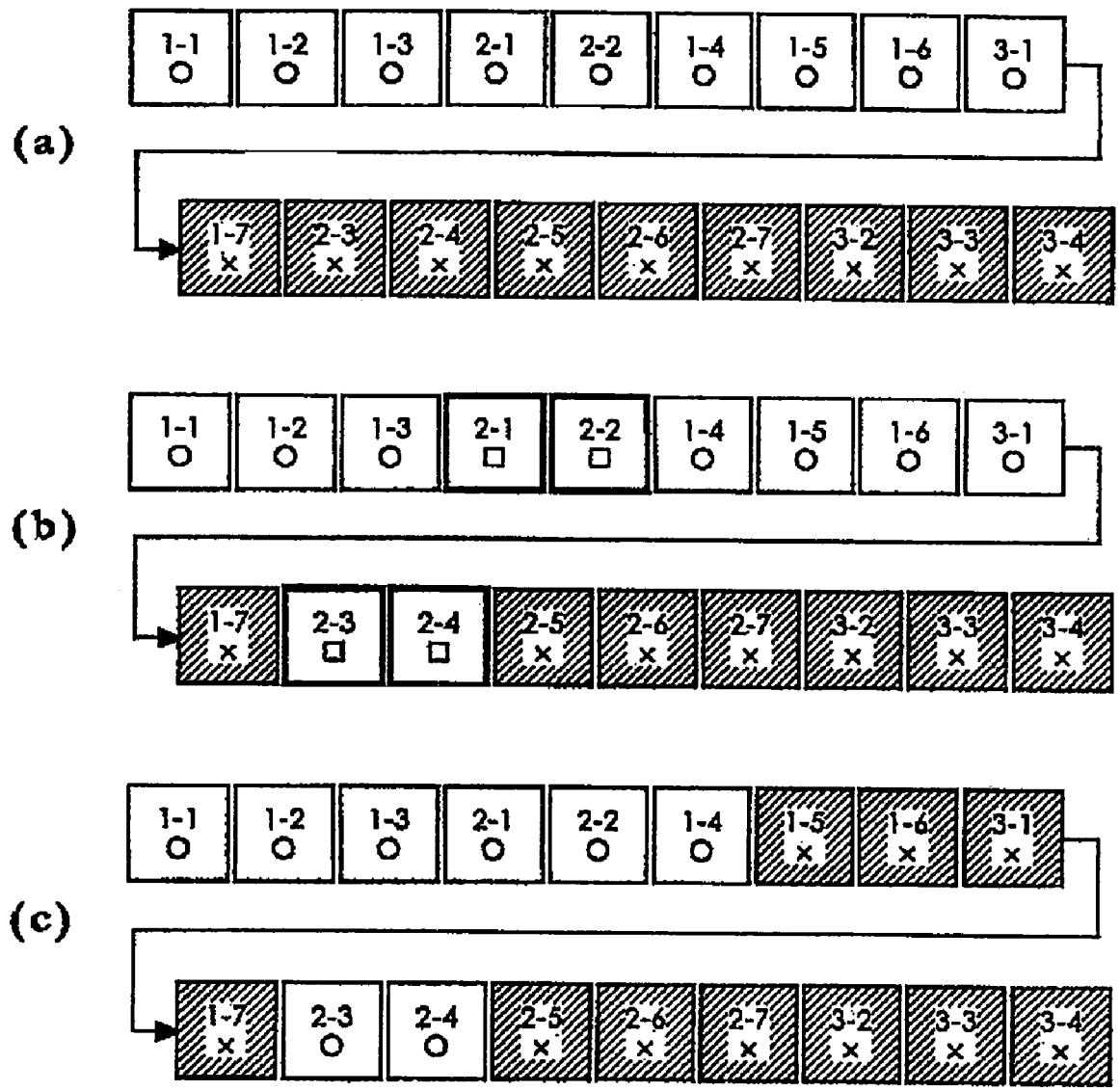
FIGS. 19(a) (b) and (c) give views showing states of sequences of display elements when a specific region is enlarged.
FIG. 19(b) is a view showing a state after the display marks are added.
FIG. 19(c) is a view showing a state after the change.

Target regions may be single or plural. In addition, an extent of the enlargement (number of display elements to be increased) may be designated by a user or may be predetermined. FIG. 19 is views showing respective states before, in the middle of and after processing for changing the sequence of the display elements arrayed in order of the display priorities. Note that it is assumed that one rectangle represents one display element and that the sequence of the display elements is arrayed from the upper left to the lower right. Moreover, the numbers on the upper side, which are written in each rectangle, indicate a region number and an order in the region ("x-y" denotes a y-th display element in a region of a region number x), and the symbol on the lower side indicates a display state. FIG. 19(a) is a state of the sequence of the display elements before the change. The symbol "circle" written in the rectangle indicates that the concerned display element is displayed on the digest screen at present, and the symbol "cross" indicates that the display element is not displayed. Here, it is considered that the region of the region number 2 is enlarged. The "display marks" are added from a head of the region of the region number 2 in response to the extent of enlargement (number of display element desired to be increased). This state is shown in FIG. 19(b). The display mark is represented by a "blank square." Furthermore, a result of executing the processing of the flowchart shown in FIG. 18 to the end is shown in FIG. 19(c). As understood from the views, enlargement of a certain region will reduce another region (region of region number 1) and make still another region (region of region number 3) invisible.

3.2. Reduction of Specific Region

In order to reduce a specific region, there are used a method for reducing a font size, a method for lessening a line spacing and the like, a method for reducing the number of display elements to be displayed, and a combined use thereof. In order to reduce the area for the regions without reducing the number of display elements to be displayed, it is only necessary that the foregoing processing for deciding the display content of the digest screen be performed after a new font size and the like are set. Here, a method for reducing the specific region by reducing the number of display elements will be described below with reference to FIG. 20.

Figure 20:
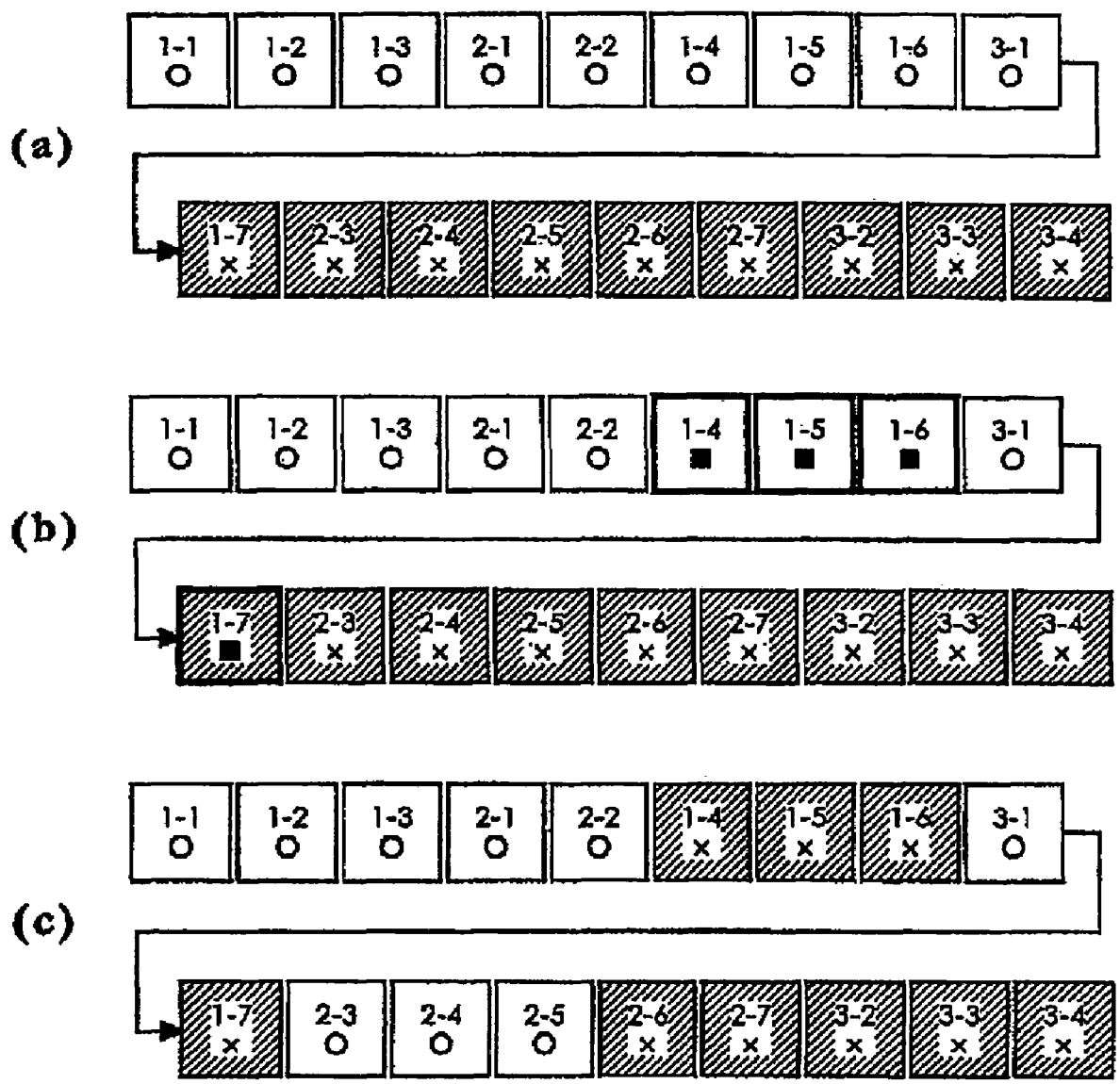
FIGS. 20(a), (b) and (c) show states of the sequences of the display elements when a specific region is reduced.
FIG. 20(b) is a view showing a state after the non-display marks are added.
FIG. 20(c) is a view showing a state after the change.

Target regions may be single or plural. In addition, an extent of the reduction (number of display elements to be reduced) may be designated by a user or may be predetermined. In FIG. 20, meanings of the figures, numbers and symbols are the same as those described in FIG. 19. FIG. 20(a) shows a sequence of the display elements before the change. Here, it is considered that the region of the region number 1 is reduced. The "non-display marks" are added from the last of the region of the region number 1 in response to the extent of reduction (number of display elements desired to be reduced). This state is shown in FIG. 20(b). The non-display mark is represented by a "solid square." Furthermore, a result of executing the processing of the flowchart shown in FIG. 18 to the end is shown in FIG. 20(c). As understood from FIG. 20, reduction of a certain region will enlarge another region (region of region number 2) and make a region that has been invisible (none in FIG. 20) visible.

3.3. Deletion of Specific Region

Deletion of a specific region is to make a region that is visible at present invisible and to make the region a merged region merged with another visible region. In order to delete the (single or plural) specific region (to make the region invisible), it is only necessary to make all of the display elements belonging to the region invisible. To be more specific, it is only necessary to add the "non-display marks" to all of the display elements belonging to the concerned region in Step S80 of the flowchart shown in FIG. 17.

3.4. Display of Specific Invisible Region

Display of a specific invisible region is to make a region that is invisible at present visible and newly displayed. Thus, in most cases, the display area for the other regions will be reduced. In order to display the (single or plural) specific region (to make the region visible), it is only necessary to display at least one of the display elements belonging to the concerned region. To be more specific, it is only necessary to add the "display marks" to at least one of the head display elements belonging to the concerned invisible region in Step S80 of the flowchart shown in FIG. 17.

3.5. Selection of Specific Region

Selection of a specific region is to display only a designated region and to make the other regions invisible. In order to display the (single or plural) specific region and not to display the other regions, it is only necessary to display at least one of the display elements belonging to a region desired to be displayed, and not to display any display elements belonging to regions not desired to be displayed. To be more specific, it is only necessary to add the "display marks" to at least one of the head display elements belonging to the region desired to be displayed, and to add the "non-display marks" to all of the display elements belonging to the region not desired to be displayed in Step S80 of the flowchart shown in FIG. 17.

Note that, though the method for changing the display content of the digest screen in response to the operation of the user has been described in this embodiment, it is needless to say that the display content of the detail screen can also be changed by the same method.

Moreover, though the case of applying the present invention to the browsing of the Web page has been described in this embodiment, it is needless to say that the application target of the present invention is not limited to the browsing of the Web page. If control information for setting a format of a document in a variety of document editing systems such as a word processor, the display priorities and the layout information for the regions are obtained based on the control information, thus making it possible to apply the present invention to the browsing of the document in the variety of document editing systems.

As described above, according to the present invention, it can be certainly guaranteed that the document, such as the Web page, the layout of which is predetermined by the creator is transformed to fit within the display required by the reader. Therefore, "no scroll operations" are guaranteed in the Web browsing with a PC and the like. Furthermore, in recent years, accesses from household electric appliances such as a refrigerator and a microwave oven to the Web have been made possible by emergence of pervasive computing. That the document is guaranteed to fit in a certain area is also effective when browsing a Web page displayed on an Internet household electric appliance having only a fixed and relatively small display area. Moreover, the display elements of the display content of the digest screen are selected based on the display priorities of the display elements, and therefore, the limited display area can be effectively utilized in terms of information acquisition. Furthermore, accesses can also be made to the regions that are not displayed on the digest screen at all as a result of selecting the display elements. Moreover, according to the present invention, the detail screen is displayed in a digest format, and therefore, such browsing as approaching the target portion by narrowing step by step the range from which information is to be acquired can be performed while confirming the whole structure of the page. Furthermore, according to the present invention, the digest display and the detail content display can be changed in response to the operation of the user, and therefore, the browsing environment comfortable for the user can be provided.

Although the preferred embodiments of the present invention have been described in detail, it should be understood that various changes, substitutions and alterations can be made therein without departing from spirit and scope of the inventions as defined by the appended claims. Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An information processing apparatus comprising:

a processor;

computer memory;

means for creating a digest of a document a layout of which is determined, when said layout being too large to fit in a display screen of a display device or when a document reader requires said document to be zoomed for reading characters displayed on the display device, the document including a plurality of regions, each region including one or more display elements, the means for creating comprising:

means for selecting the display elements based on display priorities of the display elements, and for deciding all of selected display elements as a display content of a digest screen under a condition where a total display area of all of the selected display elements does not exceed a required display area;

means for setting a merging relationship among the regions by deciding a merging region, with which a region not being displayed on the digest screen is merged, from among regions displayed on the digest screen based on layout information for the regions in the document, all of the regions being included in the document;

means for ensuring access to information lost by creating the digest and ensuring said digest fits optimally on said display device;

means for deciding, as a display content of a detail screen, a region group including the regions displayed on the digest screen and the region merged with the displayed regions in response to that a detail display of the displayed regions is required; and means for creating control information for controlling a display of the detail screen, wherein the means for deciding the display content of the detail screen creates a digest of the detail screen based on the control information when the region group is too large to fit in the required display area;

wherein the means for deciding the display content of the digest screen further includes means for changing the display content of the digest screen based on an operation of a user; and wherein the changing means includes means for automatically changing the display content of the digest screen, accompanying the operation of the user, and further comprising selective implemented performance capability of employing:

means for deciding, as a display content of a detail screen, a region group including regions displayed on a digest screen and a region merged with displayed regions in response to a detail display of the displayed regions is required;

means for creating control information for controlling a display of the detail screen, wherein the means for deciding the display content of the detail screen creates a digest of the detail screen based on the control information when the region group is too large to fit in the required display area;

wherein the means for deciding the display content of the digest screen further includes means for changing the display content of the digest screen based on an operation of a user;

wherein the changing means includes means for automatically changing the display content of the digest screen, accompanying the operation of the user;

means for transmitting information for creating the digest of the document the layout of which is determined to a client terminal together with the document;

means for obtaining display priorities of a plurality of display elements belonging to each of a plurality of regions of the document based on attributes of the display elements;

means for creating layout information for the regions in the document; and wherein the means for obtaining the display priorities further comprises:

means for arraying, for each of the regions, the display elements belonging to the regions in accordance with a predetermined criterion, means for obtaining a ratio of a cumulative length of each of the arrayed display elements in each of the regions by dividing the cumulative length by a total length of the region, and means for dividing the ratio of the cumulative length by a significance of the region to which the display element belongs, the ratio having been obtained for each of the display elements.

2. A method comprising employing a processor and computer memory for creating a digest of a document a layout of which is determined, when said layout being too large to fit in a display screen of a display device or when a document reader requires said document to be zoomed for reading characters displayed on the display device, the document including a plurality of regions, each region including one or more display elements, the step of creating comprising the steps of:

selecting the display elements based on display priorities of the display elements, and for deciding all of selected display elements as a display content of a digest screen under a condition where a total display area of all of the selected display elements does not exceed a required display area;

setting a merging relationship among the regions by deciding a merging region, with which a region not being displayed on the digest screen is merged, from among regions displayed on the digest screen based on layout information for the regions in the document, all of the regions being included in the document; and ensuring access to information lost by creating the digest and ensuring said digest fits optimally on said display device; and further comprising as a display content of a detail screen, using a region group including the regions displayed on the digest screen and the region merged with the displayed regions in response to that a detail display of the displayed regions is required;

creating control information for controlling a display of the detail screen; and creating a digest of the detail screen based on the control information when the region group is too large to fit in the required display area;

changing the display content of the digest screen based on an operation of a user; and further comprising selective implemented performance capability of:

deciding, as a display content of a detail screen, a region group including regions displayed on a digest screen and a region merged with displayed regions in response to a detail display of the displayed regions is required;

creating control information for controlling a display of the detail screen, wherein the step of deciding the display content of the detail screen creates a digest of the detail screen based on the control information when the region group is too large to fit in the required display area;

wherein the step of deciding the display content of the digest screen further includes changing the display content of the digest screen based on an operation of a user;

wherein the changing means includes automatically changing the display content of the digest screen, accompanying the operation of the user;

transmitting information for creating the digest of the document the layout of which is determined to a client terminal together with the document;

obtaining display priorities of a plurality of display elements belonging to each of a plurality of regions of the document based on attributes of the display elements;

creating layout information for the regions in the document; and wherein the step of obtaining the display priorities further comprises:

arraying, for each of the regions, the display elements belonging to the regions in accordance with a predetermined criterion, obtaining a ratio of a cumulative length of each of the arrayed display elements in each of the regions by dividing the cumulative length by a total length of the region, and dividing the ratio of the cumulative length by a significance of the region to which the display element belongs, the ratio having been obtained for each of the display elements.

3. A physical computer readable medium storing a program comprising code for creating a digest of a document a layout of which is determined, when said layout being too large to fit in a display screen of a display device or when a document reader requires said document to be zoomed for reading characters displayed on the display device, the document including a plurality of regions, each region including one or more display elements, the program allowing a computer to realize:

a function to select the display elements based on display priorities of the display elements, and to decide all of selected display elements as a display content of a digest screen under a condition where a total display area of all of the selected display elements does not exceed a required display area;

a function to set a merging relationship among the regions by deciding a merging region, with which a region not being displayed on the digest screen is merged, from among regions displayed on the digest screen based on layout information for the regions in the document, all of the regions being included in the document; and a function to ensure access to information lost by creating the digest and ensuring said digest fits optimally on said display device;

wherein:

the program further allows the computer to realize a function to decide, as a display content of a detail screen, a region group including the regions displayed on the digest screen and the region merged with the displayed regions in response to that a detail display of the displayed regions is required;

the program further allows the computer to realize: a function to create control information for controlling a display of the detail screen; and a function to create a digest of the detail screen based on the control information when the region group is too large to fit in the required display area; and the program further allows the computer to realize a function to change the display content of the digest screen based on an operation of a user.

* * * * *